(12) United States Patent
Schillke et al.

(10) Patent No.: US 8,345,262 B2
(45) Date of Patent: Jan. 1, 2013

(54) METHOD AND APPARATUS FOR DETERMINING A DEVIATION OF AN ACTUAL SHAPE FROM A DESIRED SHAPE OF AN OPTICAL SURFACE

(75) Inventors: Frank Schillke, Aalen (DE); Rolf Freimann, Aalen (DE); Matthias Dreher, Ulm (DE)

(73) Assignee: Carl Zeiss SMT GmbH, Oberkochen (DE)

(*) Notice: Subject to any disclaimer, the term of this patent is extended or adjusted under 35 U.S.C. 154(b) by 0 days.

(21) Appl. No.: 13/361,442

(22) Filed: Jan. 30, 2012

(65) Prior Publication Data

US 2012/0127481 A1    May 24, 2012

Related U.S. Application Data

(63) Continuation of application No. 12/263,564, filed on Nov. 3, 2008, now Pat. No. 8,104,905, which is a continuation-in-part of application No. PCT/EP2007/006639, filed on Jul. 26, 2007.

(30) Foreign Application Priority Data

Jul. 28, 2006  (DE) .................. 10 2006 035 022

(51) Int. Cl.
 *G01B 11/02* (2006.01)
(52) U.S. Cl. ............................................. 356/512
(58) Field of Classification Search .......... 356/512–515, 356/521
See application file for complete search history.

(56) References Cited

U.S. PATENT DOCUMENTS

| | | | |
|---|---|---|---|
| 4,936,665 A | 6/1990 | Whitney | |
| 5,155,553 A | 10/1992 | Chen | |
| 5,530,547 A | 6/1996 | Arnold | |
| 6,879,402 B2 | 4/2005 | Kuechel | |
| 6,908,200 B1 | 6/2005 | Yoshikawa et al. | |
| 6,940,607 B2 | 9/2005 | Freimann et al. | |
| 6,972,849 B2 | 12/2005 | Kuechel | |
| 7,019,842 B2 | 3/2006 | Holzapfel et al. | |
| 7,023,562 B2 | 4/2006 | De Lega | |
| 7,024,066 B1 | 4/2006 | Malendevich et al. | |
| 7,025,468 B2 | 4/2006 | Nishioka et al. | |
| 7,050,175 B1 | 5/2006 | Freimann et al. | |
| 7,061,626 B1 | 6/2006 | Schillke et al. | |

(Continued)

FOREIGN PATENT DOCUMENTS

| | | |
|---|---|---|
| DE | 32 40 360 A1 | 5/1984 |
| DE | 198 20 785 A1 | 10/1999 |
| DE | 19822453 A1 | 12/1999 |
| DE | 10125785 A1 | 11/2002 |
| DE | 10 2005 013 903 A1 | 12/2005 |

(Continued)

OTHER PUBLICATIONS

Seitz, Guenter: "Hochaufgeloeste interferometrische Absolutmessung roationssymmetrischer Oberflaechen-Fehler", DGaO-Proceedings 2006.

(Continued)

*Primary Examiner* — Michael A Lyons
(74) *Attorney, Agent, or Firm* — Sughrue Mion, PLLC

(57) ABSTRACT

An optical element having an optical surface (12; 103), which optical surface has an actual shape, the actual shape deviating from a desired shape by maximum 0.2 nm, wherein the desired shape is either: a free-form surface having a deviation from its best-fitting sphere of at least 5 μm or a substantially rotationally symmetrical surface having a deviation from its best-fitting sphere of at least 0.5 mm.

19 Claims, 14 Drawing Sheets

U.S. PATENT DOCUMENTS

| | | | |
|---|---|---|---|
| 7,118,449 B1 | 10/2006 | Dinger et al. | |
| 7,123,365 B1 | 10/2006 | Schulte | |
| 7,167,251 B1 * | 1/2007 | Ulrich et al. | 356/512 |
| 7,177,031 B2 | 2/2007 | Kessler et al. | |
| 7,405,833 B2 * | 7/2008 | Smythe et al. | 356/514 |
| 7,436,520 B1 * | 10/2008 | Doerband | 356/512 |
| 7,481,543 B1 | 1/2009 | Dinger et al. | |
| 7,511,827 B2 * | 3/2009 | Kawasaki et al. | 356/512 |
| 7,848,031 B2 | 12/2010 | Hetzler et al. | |
| 2001/0028462 A1 | 10/2001 | Ichihara et al. | |
| 2003/0184762 A1 | 10/2003 | Kim et al. | |
| 2004/0174624 A1 | 9/2004 | Welser et al. | |
| 2005/0157311 A1 | 7/2005 | Kuchel | |
| 2005/0225774 A1 | 10/2005 | Freimann et al. | |
| 2005/0275849 A1 | 12/2005 | Freimann et al. | |
| 2006/0274325 A1 | 12/2006 | Hetzler et al. | |
| 2007/0058269 A1 | 3/2007 | Mann et al. | |
| 2008/0043247 A1 | 2/2008 | Arnold et al. | |
| 2008/0068613 A1 | 3/2008 | Kuchel | |
| 2009/0128829 A1 | 5/2009 | Schillke et al. | |
| 2010/0177321 A1 | 7/2010 | Hetzler et al. | |

FOREIGN PATENT DOCUMENTS

| | | |
|---|---|---|
| DE | 10 2005 036 166 A1 | 2/2007 |
| EP | 1 160 589 A1 | 12/2001 |
| EP | 1324006 B1 | 7/2003 |
| GB | 2152227 A | 7/1985 |
| JP | 11006784 A | 1/1999 |
| WO | 03001147 A1 | 1/2003 |
| WO | 03006920 A1 | 1/2003 |
| WO | 03044456 A1 | 5/2003 |
| WO | 03048715 A1 | 7/2003 |
| WO | 2004-046641 A1 | 6/2004 |
| WO | 2005 114101 A1 | 12/2005 |
| WO | 2006-077145 A2 | 7/2006 |
| WO | 2006077145 A3 | 7/2006 |
| WO | 2006/091415 A2 | 8/2006 |
| WO | 2008/110239 A1 | 9/2008 |
| WO | 2009/006914 A1 | 1/2009 |

OTHER PUBLICATIONS

Elssner et al.: Absolute sphericity measurement, Applied Optics, 1989, vol. 28, No. 21, p. 4649-4661.

E. J. Mitemeijer, Paolo Scardi, Diffraction Analysis of the Microstructure of Materials—p. 9, Science, Springer-Verlag, Berlin-Heidelberg, 2004.

Peng Su et. al., "Dual beam generation at a ray caustic by a multiplexing computer-generated hologram", Jun. 27, 2005, Optics Express 4843.

S. Arnold, "CGH null correctors enable testing of asperic surfaces using standard interferometers", p. 40 SPIE's OE magazine, Aug. 2002.

G. Klose et. al., "High-resolution and high-precision pattern placement metrology for the 45 nm node and beyond", Submission for the 24th European Mask and Lithography Conference held Jan. 21-24, 2008.

M. Beyerlein et al., "Dual-wave-front computer-generated holograms for quasi-absolute testing of aspherics", Appl. Opt. 41, 2440-2447 (May 2002).

J. Asfour, A. Poleschuk, "Asphere testing with a Fizeau interferometer based on a combined computer-generated hologram", J. Opt. Soc. Am. A / vol. 23 Iss. 1 (2006).

W. Vogel et al., "Linienprofilanayse von Roentgen-weitwinkelreflexen . . . " Z. Naturforsch. 29a, 1152-1158 (1974).

A. F. Fercher, Computer-generated Holograms for Testing Optical Elements: Error Analysis and Error Compensation, Journal of Modern Optics, vol. 23, No. 5, pp. 347-365 (1976).

G. Schlueter et. al., "Next generation mask metrology tool", Proceedings of SPIE vol. 4754 (2002).

Seitz, Guenter: "Hochaufgeloeste interferometrische Absolutmessung roationssymmetrischer Oberflaechen-Fehler", DGaO-Proceedings 2006 Abstract.

Jensen, A.E.: "Absolute Calibration Method for Laser Twyman-Green Wave-Front Testing Interferometers", Journal Optical Society of America, 1973, vol. 663, p. 1313.

Elssner et al.: "Absolute sphericity measurement", Applied Optics, 1989, vol. 28, No. 21, p. 4649-4661.

Creath et al.: "Absolute Measurement of Spherical Surfaces", SPIE vol. 1332, p. 2-7, 1990.

Smythe, Robert: "Interferometry: Asphere interferometry powers precision lens manufacturing", Laser Focus World, Oct. 2006.

Optical Shop Testing, Second Edition, edited by Daniel Malacara, Wiley Interscience Punlication (1992), Chapters 2, 12 and 15.

* cited by examiner

METHOD AND APPARATUS FOR DETERMINING A DEVIATION OF AN ACTUAL SHAPE FROM A DESIRED SHAPE OF AN OPTICAL SURFACE

This application is a continuation of U.S. application Ser. No. 12/263,564, filed on Nov. 3, 2008, which is a continuation-in-part application of international patent application PCT/EP2007/006639, filed on Jul. 26, 2007, and claiming priority from German patent application No. DE 10 2006 035 022.7, filed on Jul. 28, 2006. The complete disclosures of these prior patent applications are incorporated into the present application by reference.

FIELD OF AND BACKGROUND OF THE INVENTION

The invention relates to a method and to an apparatus for determining a deviation of an actual shape from a desired shape of an optical surface. Furthermore, the invention relates to a method of producing an optical element. This type of apparatus is described, for example, in WO 2006/077145 A2. This apparatus comprises an interferometer for producing a measuring wave, the wavefront of which is hereupon adapted to the desired shape of the optical surface. The wavefront of the adapted measuring wave is analysed interferometrically after reflection on the optical surface, and the deviation of the actual shape of the optical surface from the desired shape of the latter is thus determined.

The optical element with the optical surface is, for example, an optical component such as for example a lens or a mirror. These types of optical component are used in optical systems, such as for example a telescope used in astronomy or in an imaging system as used in lithographic processes. The success of this type of optical system is substantially determined by a precision with which the optical components of the latter can be produced and then be processed, such that the surface forms of the latter respectively correspond to a desired form which was specified by a designer of the optical system when designing the latter. Within the framework of this type of production it is necessary to compare the form of the processed optical surfaces with the desired form of the later, and to determine any differences and deviations between the finished surface and the desired surface. The optical surface can then be processed in those regions where differences between the processed surface and the desired surface exceed, for example, pre-specified threshold values.

Generally, interferometers are used for very high precision measurements on optical surfaces. The conventional interferometer arrangement for measuring an optical surface typically comprises a coherent light source and interferometer optics in order to produce a measuring light beam which strikes the surface to be measured such that wavefronts of the measuring light have at locations of the surface to be measured respectively a same form as the desired form of the surface to be measured. In this type of situation the light of the measuring light beam strikes each location of the surface being measured essentially orthogonally and is then reflected back from the latter in itself. The reflected back measuring light is then overlaid with reference light which has been reflected by a reference surface. Deviations between the form of the surface measured and its desired form can then be established from interference thus produced.

Whereas spherical wavefronts can be produced for measuring spherical optical surfaces with a relatively high degree of precision by using conventional interferometer optics, advanced techniques are required in order to produce measuring light beams the wavefronts of which are aspherical so that the measuring light at each location of an aspherical optical surface to be measured strikes the latter orthogonally. In order to produce these types of measuring light beam optics are used which are called zero lenses, K systems or compensators. Background information with regard to these zero lenses or compensators can be found in Chapter 12 of the text book by Daniel Malacara, Optical Shop Testing, $2^{nd}$ edition, Wiley interscience Publication (1992).

This type of compensator for producing aspherical wavefronts can contain one or more refractive optical elements, such as for example lenses or one or more diffractive optical elements, such as for example diffraction gratings or holograms. Background information with regard to the use of diffraction gratings in interferometer optics can be found in Chapters 15.1, 15.2 and 15.3 of the text book by Daniel Malacara.

This diffraction grating can be, for example, a computer-generated hologram (CGH) which is produced by the structure of the interferometer being simulated by a suitable calculation method, such as for example a ray tracing method, and a phase function of the diffraction grating being calculated here such that the latter has a desired function in the optical path of the interferometer arrangement. This can then be produced from the calculated phase function of the diffraction grating.

Methods for producing these types of computer-generated hologram include, for example, writing the grating with a laser beam or an electron beam with the aid of lithographic steps.

One problem here is that the effect of a diffraction grating with high line densities with which a grating period is not substantially greater than the wave length of the measuring light used is difficult to predict with a simple diffraction theory and moreover production-dependent parameters of the grating, such as for example the base height, edge steepness and the rounding of edges influence the effect of the grating. Such influences are not defined by the grating period alone, and in the present technical field are also called rigorous effects.

From WO03/048715 A1 an interferometer arrangement with a CGH is known which produces two types of wavefront, one type of wavefront being aspherical wavefronts which are used for measuring an aspherical optical surface, whereas the other type of wavefront is substantially spherical wavefronts with which a calibration block is measured. From the measurement of the calibration block, conclusions can be drawn regarding the effect of the hologram upon the measuring light which can then be used when analysing the measurement on the aspherical optical surface.

The so-called rotation averaging method has proven to be advantageous for the most precise interferometric measurements. The rotation averaging method is however only suitable for measuring rotationally symmetrical surfaces. Free-form surfaces without rotational symmetry can not be measured using the rotation averaging method. With strongly decentred off-axis aspheres a measurement in a number of rotational positions can only be obtained with clear disadvantages. An off-axis asphere is understood as meaning a basically rotationally symmetrical asphere which has a surface region to be measured which is strongly decentred with regard to its axis of symmetry. For the measurement in a number of rotational positions with this type of off-axis asphere the test optics must not only be designed for the off-axis useful region to be tested, but in fact for the rotationally symmetrical parent asphere, which leads to reduced local resolution.

SUMMARY OF THE INVENTION

It is an object of the invention to solve the aforementioned problems, and in particular to provide a method and an apparatus for high precision measurement of optical surfaces of any shape, in particular aspherical optical surfaces. In particular, the invention should enable measurement of non-rotationally symmetrical surfaces. These types of non-rotationally symmetrical optical surfaces include, for example, optical surfaces of non-rotationally symmetrical specimens or off-axis regions of rotationally symmetrical specimens.

According to the invention a method is provided for determining a deviation of an actual shape from a desired shape of an optical surface. The method according to the invention comprises the following steps: providing an incoming electromagnetic measuring wave, providing two diffractive structures which are designed to reshape the wavefront of an arriving wave, calibrating at least one of the diffractive structures by radiating the incoming measuring wave onto the at least one diffractive structure and determining a calibration deviation of the actual wavefront from a desired wavefront of the measuring wave after interaction of the latter with the at least one diffractive structure to be calibrated, positioning the two diffractive structures in the optical path of the incoming measuring wave such that individual rays of the measuring wave radiate through both diffractive structures, and reshaping the incoming measuring wave by means of the two diffractive structures to form an adapted measuring wave the wavefront of which is adapted to the desired shape of the optical surface, positioning the optical surface in the optical path of the adapted measuring wave so that the adapted measuring wave interacts with the optical surface, and measuring the wavefront of the adapted measuring wave after interaction of the latter with the optical surface.

According to the invention the object is further achieved with an apparatus for determining a deviation of an actual shape from a desired shape of an optical surface. The apparatus according to the invention comprises means for providing an incoming electromagnetic measuring wave, two diffractive structures which are respectively designed to reshape the wavefront of an arriving wave, both diffractive structures in a measuring mode of the apparatus being disposed in the optical path of the incoming measuring wave such that individual rays of the incoming measuring wave radiate through both diffractive structures, and the incoming measuring wave is reshaped by means of the two diffractive structures to form an adapted measuring wave the wavefront of which is adapted to the desired shape of the optical surface. The apparatus according to the invention further comprises means for calibrating at least one of the two diffractive structures which are designed to determine a calibration deviation of the actual wavefront from a desired wave front of the measuring wave after interaction of the latter with the at least one diffractive structure to be calibrated, and a wavefront measuring device for measuring the wavefront of the adapted measuring wave after interaction of the latter with the optical surface.

By means of these types of diffractive structure according to the invention the desired wavefront can be manipulated arbitrarily with high precision. This type of diffractive structure can have a hologram, in particular a computer-generated hologram (CGH). A CGH is produced by calculating a suitable grating using a computer with methods such as for example beam tracking and writing the calculated grating onto a surface of a substrate. The grating can be produced, for example, using a lithographic method. The use of a diffractive structure enables very precise coordination of the desired wavefront of the adapted measuring wave.

Measurement of the wavefront of the adapted measuring wave after interaction of the latter with the optical surface can be implemented, for example, using an interferometer. Interferometers suitable for this include for example Fizeau type, Twyman Green type, Michelson type and Mach-Zehnder type interferometers etc. Examples of these types of interferometer are described, e.g. in Chapter 2 of the text book by Daniel Malacara, Optical Shop Testing, $2^{nd}$ edition, Wiley Interscience Publication (1992). The deviation of the actual shape of the optical surface from its desired shape can be determined from the wavefront measured. Advantageously, the method according to the invention comprises the step of determining the deviation of the actual shape of the optical surface from its desired shape from the wavefront measured.

As explained above, calibration of at least one of the two diffractive structures is implemented by radiating the incoming measuring wave onto the at least one diffractive structure to be calibrated and determining a deviation, here called a calibration deviation, of the actual wavefront from a desired wavefront of the measuring wave after interaction of the latter with the at least one diffractive structure to be calibrated. According to the invention therefore the incoming measuring wave is analysed after interaction of the latter with the diffractive structure to be calibrated, e.g. for example after reflection of the latter on the diffractive structure or the passage of the latter through the diffractive structure with regard to the deviation of its actual wavefront from a desired wavefront. The calibration deviation thus determined is therefore a measure for the deviation of the measuring wave after interaction with the diffractive structure to be calibrated from a desired wave. When passing through the two diffractive structures, the incoming measuring wave is reshaped to form the adapted measuring wave, the wavefront of which is adapted to the desired shape of the optical surface. The individual rays of the adapted measuring wave respectively strike the desired shape of the optical surface perpendicularly (autocollimation position).

By means of the calibration according to the invention of at least one of the two diffractive structures determination of the deviation of the actual shape from the desired shape of the optical surface can be implemented with high precision. The deviation which is known very precisely by means of the calibration of the actual wavefront from the desired wavefront of the measuring wave after its interaction with the at least one diffractive structure to be calibrated can be taken into account calculationally when determining the deviation of the actual shape from the desired shape of the optical surface.

According to the invention individual rays of the incoming measuring wave radiate through both diffractive structures. According to the invention, for this purpose, for example, the two diffractive structures can be disposed on separate substrates one after the other in the optical path of the incoming measuring wave. Alternatively, the two diffractive structures can, for example, be overlaid on a common substrate such that one of the two diffractive structures forms a base grating, and the other diffractive structure forms an over-grating. In this case too there are individual rays of the incoming measuring wave which radiate through both diffractive structures in the form of the base grating and the over-grating.

In one embodiment according to the invention two diffractive structures are provided which are disposed either overlaid over one or separately over different surfaces. A first of the diffractive structures has a high line density in comparison to the line density of the second diffractive structure. Errors in the first diffractive structure have a comparably large influence upon the resulting wavefront. Rigorous effects are also experienced strongly with the first diffractive structure. The second diffractive structure has a low diffraction effect. Errors in the second diffractive structure have a comparably small influence upon the resulting wavefront. Rigorous effects are only experienced to a small degree with the second structure. Therefore, the influences of errors can be predicted very well by means of theoretical calculation and qualification (measuring) of the first diffractive structure.

The combination of the beam-forming effect of both diffractive structures produces from the incoming light of an interferometer a test wave for shape testing or form testing of an asphere, an off-axis asphere or a free-form surface and a calibration wave for measuring a known reference object.

By calculating the calibration with the theoretical calculations and the qualification, the errors of the test wave can be determined very well and can be taken into account during the shape test. The combination of the beam-forming effect upon the basis of the diffraction on the individual diffractive structures can be mathematically described by:

$$\phi_P = m_1^* \phi_1 + m_{2P}^* \phi_2$$

$$\phi_K = m_1^* \phi_1 + m_{2K}^* \phi_2$$

$\phi_{P/K}$ indicating the wavefronts of the test and calibration wave, $\phi_{1/2}$ indicating the wavefronts produced by diffractive structures with a high or low line density in first order, $m_1 \neq 0$ indicating the diffraction order common to the test and calibration wave on the diffractive structure with high line density, $m_{2P} \neq m_{2K}$ indicating the different diffraction orders for the test and calibration wave on the diffractive structure with low line density.

In one embodiment according to the invention the diffractive structures are arranged sequentially. For this purpose the latter can be disposed on separate substrates. This offers the possibility, either for calibration or for shape testing, of removing a substrate (+ grating) totally from the optical path. Alternatively, the sequentially arranged diffractive structures can be disposed on the front and rear side of a common substrate. In an alternative embodiment according to the invention the diffractive structures are arranged overlaid, a coarse grating ($\phi_2$) acting as an over-grating for a fine grating ($\phi_1$). Both the fine grating and the coarse grating can be designed as amplitude or phase gratings. Designed as phase gratings the efficiency of the gratings is increased because, firstly, they do not block light (e.g. by absorption), and secondly, suppress the zeroth diffraction order and convey the light proportionally to the other diffraction orders.

In an embodiment according to the invention already mentioned, the diffractive structures are arranged one after the other in the optical path of the incoming measuring wave. A first diffractive structure is calibrated. The other diffractive structure only has to perform a relatively small wavefront deformation. This can therefore be produced with relatively high precision with regard to its wavefront deformation property. Therefore, an adapted measuring wave can be provided the deviations of which from the desired shape of the optical surface are known very precisely. This applies to any desired shapes of the optical surface. Therefore, the optical surface can for example be designed as a free-form surface. Therefore, by means of the precise knowledge of the wavefront of the adapted measuring wave the optical surface can be measured with high precision.

By means of the calibration according to the invention of the first diffractive structure, a large part of the test assembly error can be calibrated. Essentially, only error contributions from the second diffractive structure remain. By means of the calibration according to the invention a large part of the test assembly errors can be calibrated. The remaining error contributions are then traced back to inaccuracies in the production of the substrate of the diffractive structures with regard to shape and homogeneity, deformations of the substrate during the specimen measurement, writing errors of the diffractive structure and rigorous errors when using a CGH as a diffractive structure. Rigorous errors of a CGH are understood as being deviations in the line gradient of the diffractive structures which are produced in simplified, model calculation in comparison to the rigorous calculation of the structures by means of the Maxwell equations.

Since the other diffractive structure only has to perform a comparably small wavefront deformation, a small band density is sufficient for the diffractive structure. Therefore the aforementioned remaining error contributions only bring about small errors. Wavefront errors due to CGH writing errors are therefore in scale with the band density. Errors due to the deflection of the substrate are also in scale with the deformation effect and so the band density of the CGH. The contributions from rigorous effects are overproportionately in scale with the band density of the CGH. The precision of the rigorous calculations is also substantially higher with small band densities.

An approximately straight-lined band gradient, achievable according to the invention, with small line densities and without singularities of the second diffractive structure supports a uniform production process for the latter. Errors in the wavefront of the wave produced by the diffractive structure, which derive from the writing process of the diffractive structures, are minimised. This enables uniform etching of the structures. The smaller uncertainties in the profile shapes thus achieved lead to more precise qualification of the diffractive structure.

In an embodiment according to the invention already mentioned, the diffractive structures are respectively disposed on their own substrate, i.e. a first diffractive structure forms part of a first diffractive element with a first substrate, and a second diffractive structure forms part of a second diffractive element with a second substrate. In an alternative embodiment according to the invention the two diffractive structures are overlaid on a surface of a common substrate. Advantageously, a first of the diffractive structures forms a base grating, and a second of the diffractive structures an over-grating.

In a further advantageous embodiment a first of the two diffractive structures, when reshaping the incoming measuring wave, which is advantageously a flat wave, to form the adapted measuring wave, brings about the predominant portion of the wavefront reshaping. Therefore, the first diffractive structure has a high diffraction effect. In this embodiment the first diffractive structure bringing about the predominant portion of the wavefront reshaping is calibrated. In one particularly advantageous embodiment this diffractive structure brings about the greatly predominant portion of the wavefront reshaping, i.e. a portion of the wavefront reshaping which is so predominant that normal production errors in the other diffractive structure only bring about negligible imprecision when measuring the optical surface. Advantageously, the first diffractive structure has a line density which is high in comparison to the line density of the second diffractive structure.

Furthermore, it is advantageous if the line density of one of the two diffractive structures, advantageously of the other or second diffractive structure, is maximum 30 lines/mm. With this type of small line density writing errors when producing the diffractive structure with regard to the measuring precision produced by it when measuring the optical surface by means of the method according to the invention is hardly of any consequence. This type of limitation is possible, for example, if a maximum deviation of the desired shape of the optical surface of the best-fitting sphere is 1° and the incoming measuring wave is converted by means of the calibrated diffractive structure into a wave the wavefront of which is adapted to the best-fitting sphere.

Furthermore, it is advantageous if the method according to the invention further comprises the step of determining the deviation of the actual shape from the desired shape of the optical surface from the measured wavefront of the adapted measuring wave taking into consideration the calibration deviation. Consideration of the calibration deviation enables a subsequent calculational correction of the measured shape of the optical surface.

In a further advantageous embodiment the reshaping of the incoming measuring wave to form the adapted measuring wave comprises the steps: reshaping the incoming measuring wave by means of a first of the two diffractive structures to form an approximated measuring wave the wavefront of which is approximated to the desired shape of the optical surface, and reshaping of at least part of the approximated measuring wave to form the adapted measuring wave by means of the second diffractive structure which is disposed in the optical path of the approximated measuring wave. The adaptation of the wavefront of the incoming measuring wave to the desired shape of the optical surface is therefore implemented step by step, first of all by reshaping the incoming measuring wave to form the approximated measuring wave and thereupon to form the adapted measuring wave.

In order to minimize reflections, the incoming measuring wave advantageously strikes the first diffractive structure at an inclined angle. This can be brought about e.g. by a pre-set prism or by positioning the first diffractive structure at an angle.

Advantageously, the first diffractive structure which the incoming measuring wave strikes in the measuring mode is calibrated. Therefore, the shape of the approximated measuring wave is known very precisely. Only wavefront errors caused by the second diffractive structure falsify the measurement result of the optical surface.

In a further advantageous embodiment the propagation direction of the adapted measuring wave is tilted in relation to the propagation direction of the approximated measuring wave. The tilt angle between the two propagation directions is advantageously more than 3°, and preferably approximately 8°. By means of the tilting disruptive reflections are reduced by means of which an approximately straight band density gradient is made possible on the second diffractive structure, the resulting line density furthermore remaining comparably small.

Furthermore, it is advantageous if the approximated measuring wave has a spherical wavefront. This type of spherical wavefront can be calibrated with high precision, for example by means of a calibration sphere.

Moreover, it is advantageous if the wavefront of the approximated measuring wave substantially has the shape of the best-fitting sphere of the optical surface, and so is approximated to or has the shape of the best-fitting sphere. Therefore, the deformation to be brought about by the second diffractive structure is restricted only to the deviations of the desired shape of the optical surface from the best-fitting sphere of the latter. These deviations are generally relatively small, by means of which the errors caused by the production tolerances of the second diffractive structure can also be kept small.

Furthermore, it is advantageous if the approximated measuring wave has an aspherical wavefront. An aspherical wavefront is understood as being a wavefront which deviates from a spherical form, but is not level.

Furthermore, it is advantageous if the aspherical wavefront of the approximated measuring wave is configured such that when the approximated measuring wave passes through a plane parallel plate with the thickness of a substrate assigned to the second diffractive structure, the aspherical wavefront of at least part of the approximated measuring wave is reshaped to form a calibration wave the wavefront of which has a cross-section in the shape of a conic section, in particular a spherical form. The cross-section of the wavefront is understood as being a section through the wave perpendicular to the propagation direction of the latter. The wavefront having a cross-section in the shape of a conic section can therefore, for example, be spherical or extend along the surface of an ellipsoid, a paraboloid or a hyperboloid etc. A wavefront having this type of shape can be calibrated with high precision by means of a calibration object also having this shape. This can be implemented for example by reflecting the wave on this calibration object and interferometrically measuring the reflected wave. Therefore, the approximated measuring wave can be calibrated after passing through the second diffractive structure by means of a calibration object the shape of which can be determined with high precision. From this information one can then come to a conclusion regarding the actual shape of the measuring wave directly after the latter has passed through the first diffractive structure. In this embodiment the error contributions which are caused by production tolerances of the substrate of the second diffractive structure, can be co-calibrated. These types of production tolerance include shape and homogeneity of the substrate. Therefore, only the deformation or deflection of the substrate during measurement, CGH writing errors and rigorous errors of the CGH remain as error contributions. These contributions are advantageously measured and converted into corresponding calibration data.

Due to the low refractive power and small band density of the diffractive element, these data are only associated with a small degree of uncertainty.

Advantageously, the approximated measuring wave is reshaped both to form the adapted measuring wave and the calibration wave by means of the second diffractive structure. Advantageously, the propagation direction of the adapted measuring wave is tilted in relation to the propagation direction of the calibration wave. The tilt angle is advantageously greater than 3° and is preferably approximately 7°. In one advantageous embodiment the calibration wave is the zeroth diffraction order of the approximated measuring wave passing through the second diffractive structure. The light in the higher diffraction order passing through the second diffractive structure serves as an adapted measuring wave. In an alternative embodiment the second diffractive structure is encoded a number of times and so has a number of, in particular two, grating structures independent of one another. Whereas the calibration wave is produced by a grating structure, the adapted measuring wave is produced by a second grating structure. By producing both a calibration wave and an adapted measuring wave, after the calibration step the optical surface can be measured without previously having to change the arrangement of the first and the second diffractive element. Therefore, the effect of mechanical tolerances can be minimised, by means of which the precision of the measuring result can be improved.

In a further advantageous embodiment the aspherical wavefront of the approximated measuring wave has a cross-section in the shape of a conic section. In this case it is possible to calibrate the approximated measuring wave directly by means of a calibration object having for example the shape of an ellipsoid, paraboloid or hyperboloid.

Moreover, it is advantageous if the aspherical wavefront of the approximated measuring wave is rotationally symmetrical. In this case the approximated measuring wave can be calibrated with high precision using known methods. Non-rotationally symmetrical errors can be determined here for example by means of known rotation averaging means and rotationally symmetrical errors by means of conventional error calculations.

Furthermore, it is advantageous if when calibrating one of the two diffractive structures the actual wavefront of the measuring wave is determined absolutely after interaction of the latter with the diffractive structure to be calibrated. By means of the absolute determination of the wavefront the diffractive structure to be calibrated can be calibrated absolutely with regard to its wavefront deformation property. This makes it possible to determine the actual shape of the optical surface with improved precision.

As already explained above, it is advantageous if when calibrating the diffractive structure to be calibrated the measuring wave is reflected after interaction of the latter with the diffractive structure to be calibrated on a calibration object having a cross-section in the shape of a conic section, in particular on a calibration sphere, and interferometrically measured. Therefore, in addition to a spherical shape the calibration object can have the shape of an ellipsoid, paraboloid or hyperboloid. If the wave shape of the measuring wave has a corresponding shape after interaction of the latter with the diffractive structure to be calibrated, calibration of the wave with high precision is possible.

It is particularly advantageous here if the shape of the calibration object is determined absolutely. If the shape of the calibration object is known absolutely, the actual wavefront of the measuring wave can also be determined absolutely after interaction of the latter with the diffractive structure to be calibrated. For the absolute determination of the shape of the calibration object, for example the shear technique or the three position test known from the prior art can be used. The shear technique is for example described in the publication by Günther Seitz "Highly Resolved Interferometric Absolute Measurement of Rotationally Symmetrical Surface Errors", DGaO Proceedings 2006. The content of this document is incorporated into the disclosure of this application by specific reference. The three position test is described for example by Katherine Greath and James C. Wyant, "Absolute Measurement of Spherical Surfaces", SPIE VOL. 1332 Optical Testing and Metrology III. Recent Advances in Industrial Optical Inspection (1990), pages 2 to 7. This document is also incorporated into the disclosure by explicit reference.

In a further advantageous embodiment, when calibrating the diffractive structure to be calibrated, non-rotationally symmetrical errors of the measuring wave are determined absolutely after interaction of the latter with the diffractive structure to be calibrated. As already also mentioned above, this method offers the possibility of determining the actual wavefront of the measuring wave absolutely when the wave to be calibrated is rotationally symmetrical. This type of absolute determination of the non-rotationally symmetrical errors can be implemented for example by means of the rotation averaging method known to the person skilled in the art. Rotationally symmetrical errors can be determined using conventional error calculation (see e.g. DE 10 2005 013 903 A1).

According to a further embodiment of the invention an interferometer arrangement of the apparatus according to the invention comprises a radiation source for measuring radiation, interferometer optics for producing a measuring radiation beam in which an object to be measured can be disposed, and a detector for receiving measuring radiation after interaction of the latter with the object to be measured, the interferometer optics comprising a diffractive element in the form of a diffraction grating.

According to one particular embodiment the diffraction grating is formed from two diffraction elements of at least a first type and a second type, in at least one region of the diffraction grating a grating structure of the diffraction elements being modulated such that the latter form an over-grating.

By providing the over-grating the diffraction grating has characteristically different radiation diffracting effects. On the one hand radiation is diffracted on periodic structures which are formed by the diffraction elements of at least the first and second type positioned alternately one next to the other.

Moreover, on the other hand radiation is diffracted on periodic structures which are formed by the over-grating.

The over-grating comprises at least a first type and a second type of elongated band which are positioned alternately one next to the other and have optical properties different from one another, the bands of the first type and of the second type differing with regard to an arrangement pattern of diffraction elements within the bands.

According to one embodiment the bands of the first type differ here from the bands of the second type as regards the arrangement pattern of diffraction elements within the bands in that in the bands of the first type the diffraction elements of the first and of the second type are positioned alternately one next to the other, whereas the second type of band is free from diffraction elements of the first type of the second type.

According to an alternative embodiment for this purpose, both within the bands of the first type and within the bands of the second type diffraction elements of the first type and the second type respectively are positioned alternately one next to the other. The bands of the first and of the second type differ here from one another in that the arrangement pattern of the diffraction elements within the bands of the first type and of the second type have substantially the same spatial frequency, but are positioned phase-shifted in comparison to one another. In particular the arrangement patterns can be positioned here phase-shifted in relation to one another to such an extent that the arrangement pattern of the diffraction elements within the bands of the first type are positioned with substantially opposite phase relative to the arrangement pattern of the diffraction elements within the bands of the second type.

The diffraction elements of the first type and of the second type can be designed such that they form an amplitude grating which can be produced, for example, in that the diffraction elements of the first type have greater absorption for the measuring radiation than the diffraction elements of the second type. It is also possible for the diffraction elements of the first and of the second type to form a phase grating which can be achieved in that the diffraction elements of the first type effect a phase of the measuring radiation differently than the diffraction elements of the second type. In particular, it is also possible here to combine the effects of the diffraction grating as a phase grating and the effects of the diffraction grating as an amplitude grating so that the diffraction elements of the first type and of the second type differ both with regard to their intensity-absorbing effect and with regard to their phase-shifting effect upon the measuring radiation.

The measuring radiation is diffracted on the grating formed by the adjacent arrangement of the diffraction elements of the first and of the second type, for example into a plus first diffraction order, a minus first diffraction order, a plus second diffraction order, a minus second diffraction order etc. Furthermore, the measuring radiation is diffracted on the over-grating, here too for example into a plus first diffraction order, a minus first diffraction order, a plus second diffraction order, a minus second diffraction order etc. Since a grating period assignable to the adjacent arrangements of the diffraction elements of the at least first and second type is substantially smaller than a grating period which is assignable to the adjacent arrangement of the bands of the at least first and second type, a diffraction angle which the measuring radiation experiences upon diffraction on the grating of a given order formed by the diffraction elements is substantially greater than a diffraction angle which the measuring radiation experiences on the over-grating with the corresponding diffraction order. For example, a diffraction angle of the plus first diffraction order on the grating formed by the diffraction elements positioned one next to the other is substantially greater than a diffraction angle of the plus first diffraction order on the over-grating.

Since the measuring radiation is diffracted both on the grating formed by the diffraction elements and on the over-grating, the diffraction angles from the diffraction on the grating and the diffraction on the over-grating add up to form a total diffraction angle. A number of combinations of total diffraction angles can be produced here. It is therefore assumed, for example, that the grating formed by the adjacent arrangement of the diffraction elements mainly produces a plus first diffraction order and a minus first diffraction order and that also the over-grating mainly produces a plus first and a minus first diffraction order. Four different total diffraction angles are then produced for the measuring radiation, namely a first total diffraction angle for measuring radiation which is diffracted on the grating under plus first and on the over-grating under plus first diffraction order, a second total diffraction angle for measuring radiation which is diffracted on the grating under plus first and on the over-grating under minus first diffraction order, a third total diffraction angle for measuring radiation which is diffracted on the grating under minus first diffraction order and on the over-grating under plus first diffraction order, and a fourth total diffraction angle for measuring radiation which is diffracted on the grating under minus first diffraction order and on the over-grating under minus first diffraction order.

According to one embodiment of the invention the interferometer arrangement is configured such that measuring radiation, which is diffracted on the over-grating under a pre-specified diffraction order different from the zeroth diffraction order, produces an interference pattern detectable by the detector. Therefore, the interferometer arrangement is configured such that the diffraction on the over-grating is used for the interferometric measurement. This can be achieved, for example, by an aperture being disposed in the optical path of the interferometer arrangement which removes measuring radiation, which is diffracted on the over-grating under the zeroth diffraction order or a diffraction order different from the pre-specified diffraction order, from the optical path.

According to one embodiment of the invention, the diffraction grating is configured such that measuring radiation which is diffracted on the over-grating under a diffraction order different from the zeroth diffraction order has substantially spherical wavefronts. Since this measuring radiation is also diffracted on the grating formed by the adjacent arrangement of the diffraction elements, spherical wavefronts are produced by the combined diffraction of the measuring radiation on the grating and on the over-grating. In this way it is possible to measure and understand the effect of the diffraction grating in a test measurement with the aid of a spherical reference body. In particular, in this way effects of the diffraction grating, which for example can not be described with sufficient precision by a scalar diffraction theory, can be recorded. It can in fact be assumed that the effect of the over-grating can be described relatively well by the scalar diffraction theory upon the basis of its large grating period. If the measuring radiation which should have substantially spherical wavefronts due to the combined effect of the grating and the over-grating, actually has wavefront shapes deviating from the spherical wavefront shape, these deviations can substantially be attributed exclusively to the effect of the grating formed by the adjacent arrangement of the diffraction elements. It is therefore possible to record effects of the grating which deviate for example from a scalar diffraction theory and to take these into account when analysing measurements on an actual measuring object. For this type of measurement measuring radiation is then used which is diffracted on the over-grating under a diffraction order different from the zeroth diffraction order and the first diffraction order, and has aspherical wavefronts. The interferometer arrangement is therefore suitable for the measurement of aspherical surfaces, effects of the diffraction grating deviating from the scalar diffraction theory being calibratable by means of the measurement on a spherical test object.

In a further embodiment of the method of determining a deviation of an actual shape from a desired shape of an optical surface the two diffractive structures are respectively disposed on their own substrate and are configured such that the wavefront of the adapted measuring wave, which is generated from the incoming measuring wave by subsequently diffracting the latter at each of the diffractive structures under diffraction orders of the same sign, has a non-spherical component, wherein half of the non-spherical component is caused by each of the diffractive structures during the diffraction of the incoming measuring wave at the diffractive structures. Put in different words, each of the diffractive measuring structures contributes half of the non-spherical component of the adapted measuring wave. The diffraction of the incoming measuring wave at the respective diffractive structures is effected under diffraction orders of the same sign different from the $0^{th}$ diffraction order. In a variation the diffraction at the two diffractive structures is effected under the same diffraction order, e.g. the $+1^{st}$ diffraction order. Other examples are the $+2^{nd}$, $-1^{st}$ or $-2^{nd}$ diffraction orders, etc. Disposing the two diffractive structures on their own substrates, i.e. disposing each of the diffractive structures on a separate substrate allows for a large number of degrees of freedom in optimizing the arrangement of the diffractive structures to minimize remaining errors.

In a further embodiment according to the invention both diffractive structures are calibrated by analysing a calibration wave of spherical shape, which calibration wave is generated from the incoming measuring wave by subsequently diffracting the latter at each of the diffractive structures under diffraction orders of opposite sign. This way the non-spherical component added to the incoming measuring wave when diffracted at the first diffractive structure is removed by diffraction at the second diffractive structure. Therefore the calibration wave is left with a spherical shape only and can be used for calibration of the measuring apparatus by reflection at a calibration sphere.

In a further embodiment according to the invention the diffractive structures are configured such that the wavefront of the adapted measuring wave further has a spherical component. For this purpose a first one of the diffractive structures can be configured to contribute a predominant portion of the spherical component to the wave front of the adapted wave. A predominant portion in this context means means a component larger than 50% of the overall spherical component added by both diffractive structures. Therefore the second diffractive structure contributes or causes a portion smaller than 50%.

In a further embodiment according to the invention a first one of the diffractive structures contributes a portion of the spherical component to the wave front of the adapted wave which portion is at least one magnitude larger than a portion of the spherical component contributed by the second diffractive structure to the wave front of the adapted wave. This results in a fairly small line density for the second diffractive structure, which results in small distortion errors in the measurement as explained in more detail later. In one embodiment according to the invention the line density of one of the diffractive structures, in particular of the second diffractive structure, is less than 100 lines per millimeter. Tilting components can be provided in one or both diffractive structures.

Furthermore, according to one embodiment of the invention a method of producing an optical element with an aspherical surface is proposed, which comprises: disposing the optical element in the measuring radiation beam of the interferometer arrangement described above such that measuring radiation diffracted on the over-grating under a diffraction order strikes the aspherical surface substantially orthogonally, recording at least one intensity distribution with the detector, and processing the aspherical surface dependently upon the at least one recorded intensity distribution.

It is a further object of the invention to provide an optical element with improved properties. This object is achieved according to the invention with an optical element having an optical surface, which optical surface has an actual shape, the actual shape deviating from a desired shape by maximum 0.2 nm. According to one alternative the desired shape is a free-form surface having a deviation from its best-fitting sphere of at least 5 µm. According to a second alternative the desired shape is a substantially rotationally symmetrical surface having a deviation from its best-fitting sphere of at least 0.5 mm. The characterization according to which the actual shape deviates from the desired shape by a maximum 0.2 nm is to be understood such that, after removal of potentially existing outliers or flyers, there are no locations on the optical surface at which the actual shape deviates from the desired shape by more than 0.2 nm. Outliers or flyers are deviations which are numerically distant from the other deviations, as is known to the person skilled in statistics. Outliers can be identified using several generally known criterions.

As specified above the desired shape of the optical surface can be a free-form surface. A free form surface in the context of this application is a non-spherical surface, which has no rotational symmetry. The free-form surface according to the invention has a maximum deviation from its best-fitting sphere of at least 5 µm, and in particular of at least 20 µm. In one embodiment according to the invention the desired shape designed as a free-form surface has a maximum deviation from its best-fitting sphere of at least 5 µm and maximum 10 mm, and in particular maximum 1 mm. The best-fitting sphere is calculated fitting the desired shape to a sphere using the least mean squares (LMS) fitting method, which is known by the skilled person. The least mean squares fitting method determines the sphere, for which the mean of the respective squares of the deviations of the desired shape from a sphere at the respective locations becomes minimal. The least mean squares fit can be calculated integrally for all locations on the desired shape.

In an alternative embodiment according to the invention the desired shape of the optical surface is substantially rotationally symmetrical and has a maximum deviation from its best-fitting sphere of at least 0.5 mm, and advantageously of at least 2.5 mm. Such optical elements are also referred to as "strong aspheres".

In a further embodiment according to the invention the actual shape of the optical surface deviates by maximum 0.1 nm, in particular by maximum 0.05 nm or maximum 0.01 nm from the desired shape.

Further, according to the invention a further optical element having an optical surface is provided, which optical surface has an actual shape, the actual shape deviating from a desired shape such that the RMS value of deviations of the actual shape from the desired shape at various locations of the optical surface is at most 0.2 nm, wherein the desired shape is either a free-form surface having a deviation from its best-fitting sphere of at least 5 µm or is a substantially rotationally symmetrical surface having a deviation from its best-fitting sphere of at least 0.5 mm. The RMS value is the root mean square of the deviations of various locations of the optical surface from the desired shape.

The production of an optical element of the above types is made possible by the aforementioned method according to the invention and the apparatus according to the invention. By means of deviations of an optical surface from its desired shape established by means of the invention, the optical surface can be further processed in order to observe the specified tolerance. The actual shape of optical surfaces of currently available elements show larger deviations from their desired shape.

According to the invention further a method of manufacturing an optical element having an optical surface is provided. The manufacturing method comprises the steps of: defining a desired shape for the optical surface, and machining the optical surface such that an actual shape of the optical surface deviates from the desired shape by maximum 0.05 nm. According to a further embodiment the optical surface deviates from the desired shape by a maximum 0.01 nm. An example of the desired shape can be the above mentioned free-form surface having no rotational symmetry and having a deviation from its best-fitting sphere of at least 5 µm. A further example of the desired shape can also be the above mentioned substantially rotationally symmetrical surface having a deviation from its best-fitting sphere of at least 0.5 mm. The machining of the optical surface with such an accuracy that the actual shape of the optical surface deviates from the desired shape by a maximum of 0.05 nm can be performed using the above mentioned measurement methods, i.e. the machining is performed as a multi step process of removing material from the optical surface and measuring the actual shape of the optical surface obtained at the respective processing step before removing more material from the optical surface.

According to the invention a diffraction grating is furthermore provided which comprises: a carrier and a diffraction structure provided on the carrier which comprises a plurality of elongated diffraction elements which extend in at least one region of the diffraction structure in a plane, at least a first type of diffraction element and a second type of diffraction element being positioned in the at least one region alternately one next to the other, as viewed in directions orientated laterally to the extension directions of the diffraction elements, the first type of diffraction element and the second type of diffraction element having optical properties which are different from one another, in the at least one region at least a first type of elongated band, and a second type of elongated band extending in the plane, the first type of band and the second type of band in the at least one region being positioned alternately one next to the other, as viewed in directions orientated laterally to the extension directions of the bands, the first type of band and the second type of band differing with regard to an arrangement pattern of diffraction elements within the bands.

Furthermore, according to the invention an interferometer arrangement is provided which comprises: a radiation source for measuring radiation with an average wave length, interferometer optics for producing a measuring radiation beam in which an object to be measured can be disposed, a detector for receiving measuring radiation after interaction of the latter with the object to be measured, the interferometer optics including the aforementioned diffraction grating.

Moreover, according to the invention an interferometer arrangement is provided which comprises: a radiation source for measuring radiation with an average wave length, interferometer optics for producing a measuring radiation beam in which an object to be measured can be disposed, a detector for receiving measuring radiation after interaction of the latter with the object to be measured, the interferometer optics including a diffraction grating which is formed from diffraction elements of at least a first type and a second type, in at least one region of the diffraction grating a grating structure of the diffraction elements being modulated such that the latter form an over-grating.

Furthermore, according to the invention a method is provided for producing an optical element with an optical surface. The method comprises: using the aforementioned interferometer arrangement, disposing the optical element in the measuring radiation beam such that on the over-grating under a first diffraction order which is different to the $0^{th}$ diffraction order diffracted measuring radiation strikes the optical surface substantially orthogonally, recording at least a first intensity distribution with the detector, and processing the optical surface dependently upon the at least one first intensity distribution recorded.

The features specified in relation to the embodiments of the method according to the invention listed above can be applied correspondingly to the apparatus according to the invention. The resulting advantageous embodiments of the apparatus according to the invention should be specifically included by the disclosure of the invention. Furthermore, advantages listed above with regard to the advantageous embodiments of the method according to the invention also relate therefore to the corresponding advantageous embodiments of the apparatus according to the invention.

BRIEF DESCRIPTION OF THE DRAWINGS

In the following exemplary embodiments of the invention are described in greater detail by means of the attached diagrammatic drawings. These show as follows.

DETAILED DESCRIPTION OF EXEMPLARY EMBODIMENTS

Figure 1:
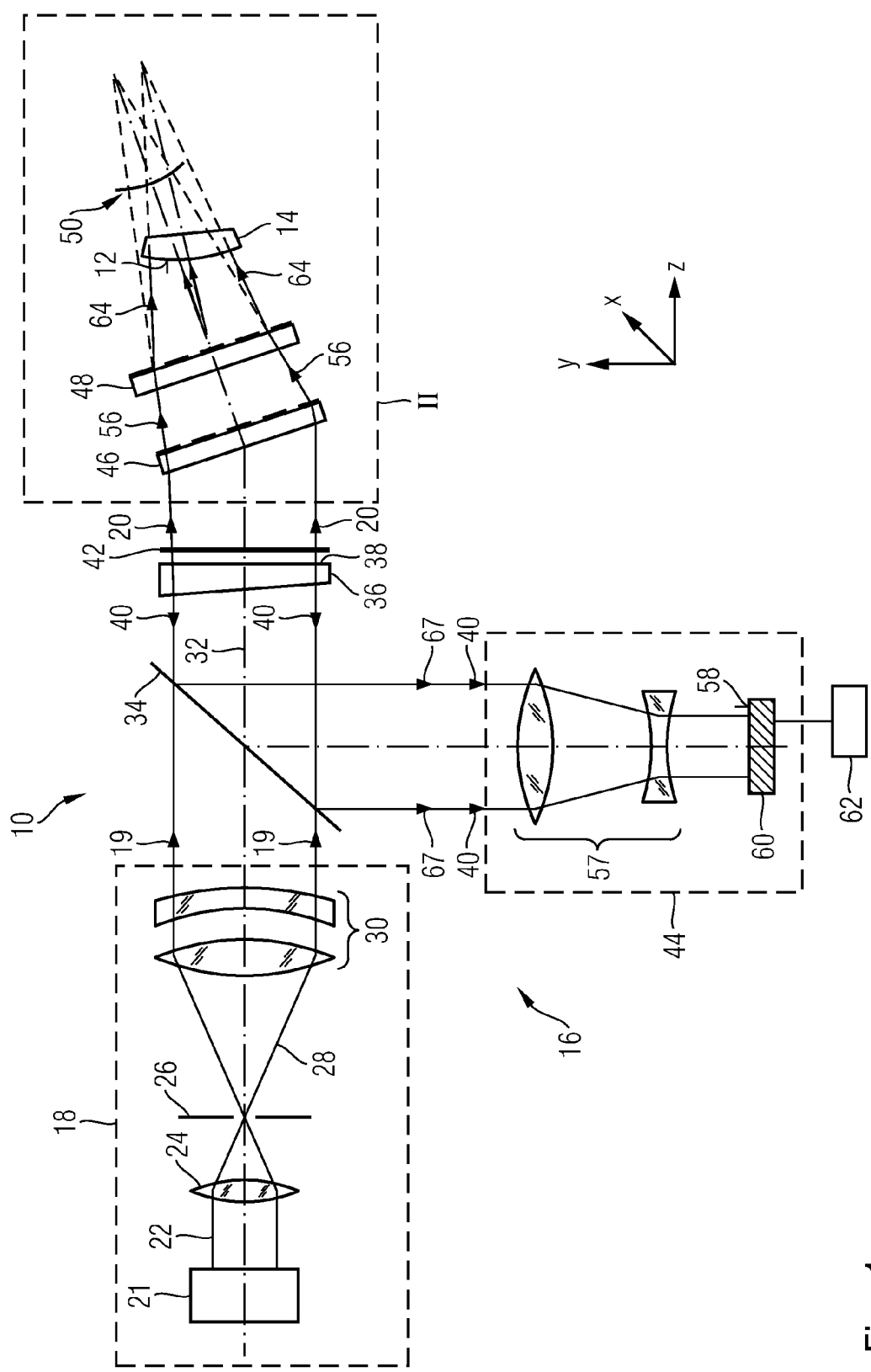
FIG. 1 an embodiment according to the invention of an interferometric measuring apparatus with two diffractive elements.

FIG. 1 illustrates an interferometric measuring apparatus 10 in an embodiment according to the invention. The measuring apparatus 10 is suitable for determining a deviation of an actual shape from a desired shape of an optical surface 12 of a specimen 14. The specimen 14 can for example be in the form of an optical lens or a mirror. The specimen 14 is mounted by means of a holder not shown in the drawings.

The interferometric measuring apparatus 10 includes an interferometer 16 which in turn includes a light source 18, a beam splitter 34 and an interferometric camera 44. The light source 18 produces illumination radiation 19 and for this purpose includes a laser 21, such as for example a helium-neon laser for producing a laser beam 22. The illumination radiation 19 has sufficient coherent light in order to take an interferometric measurement. In the case of a helium-neon laser, the wave length of the illumination radiation 19 is approximately 634 nm. However, the wave length of the illumination radiation 19 can also have other wave lengths in the visible and non-visible wave length range of electromagnetic radiation.

The laser beam 22 is focussed by a focussing lens 24 onto an aperture 26 such that a divergent beam of coherent light passes from the aperture opening. The wavefront of the divergent beam 28 is substantially spherical. The divergent beam 28 is collimated by a lens group 30, by means of which the illumination radiation 19 is produced with a substantially level wavefront. The illumination radiation 19 propagates along an optical axis 32 of the interferometer 16 and passes through the beam splitter 34.

Thereupon the illumination radiation 19 strikes a Fizeau element 36 with a Fizeau surface 38. Part of the light of the illumination radiation 19 is reflected as a reference wave 40 on the Fizeau surface 38. The light of the illumination radiation 19 passing through the Fizeau element 36 propagates further as an incoming measuring wave 20 with a level wavefront 42 along the optical axis 32 and strikes a first diffractive element 46.

In the region of FIG. 1 identified by II, in addition to the first diffractive element 46 a second diffractive element 48, the specimen 14 and a calibration sphere 50 are illustrated. However, during operation of the interferometric measuring apparatus 10 these elements are not arranged at one and the same time, as shown in FIG. 1. In fact, the elements are positioned either in the calibration arrangement shown in FIG. 2 or in the measuring arrangement shown in FIG. 3. The simultaneous illustration of the elements 46, 48, 14 and 50 in FIG. 1 only serves to illustrate the basic mode of operation of the measuring apparatus 10.

Figure 2:
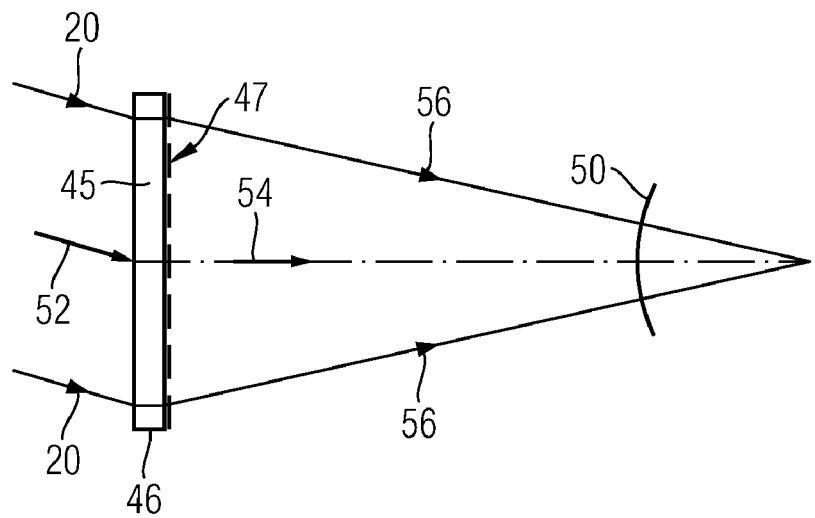
FIG. 2 the region II of the measuring apparatus according to FIG. 1 comprising a first diffractive element, in a calibration mode.

In the calibration mode of the measuring apparatus 10 illustrated in FIG. 2, the incoming measuring wave 20 is reshaped by the first diffractive element 46 to form an approximated measuring wave 56. The first diffractive element 46 comprises a first diffractive structure 47 disposed on a first substrate 45 for reshaping the incoming measuring wave 20. The first diffractive structure 47 is designed as a computer-generated hologram (CGH). In this calibration mode the second diffractive element 48 and the specimen 14 are not in the optical path of the approximated measuring wave 56. The propagation direction 54 of the approximated measuring wave 56 is deviated in relation to the propagation direction 52 of the incoming measuring wave 20. One thus prevents direct reflections from the first diffractive element 42 from passing into the interferometric camera 44. The approximated measuring wave 56 has a spherical wavefront which corresponds to the best-fitting sphere of the optical surface and strikes the calibration sphere 50. The shape of the calibration sphere 50 was previously determined absolutely by means of the aforementioned shear technique or three position technique.

After reflection on the calibration sphere 50 the approximated measuring wave 56 once again passes through the first diffractive element 46 and is steered by means of an objective system 57 of the interferometric camera 44 onto a recording surface 58 of a camera chip 60 of the interferometric camera 44. On the recording surface 58, by overlaying with the reference wave 40, an interference pattern is produced from which, by means of an analysis device 62, the deviation of the approximated measuring wave 56 from its desired wavefront in the form of a spherical wave is determined. Thus the actual wavefront of the approximated measuring wave 56 is determined absolutely by means of the calibration sphere 50 and the first diffractive element 46 is calibrated absolutely.

Figure 3:
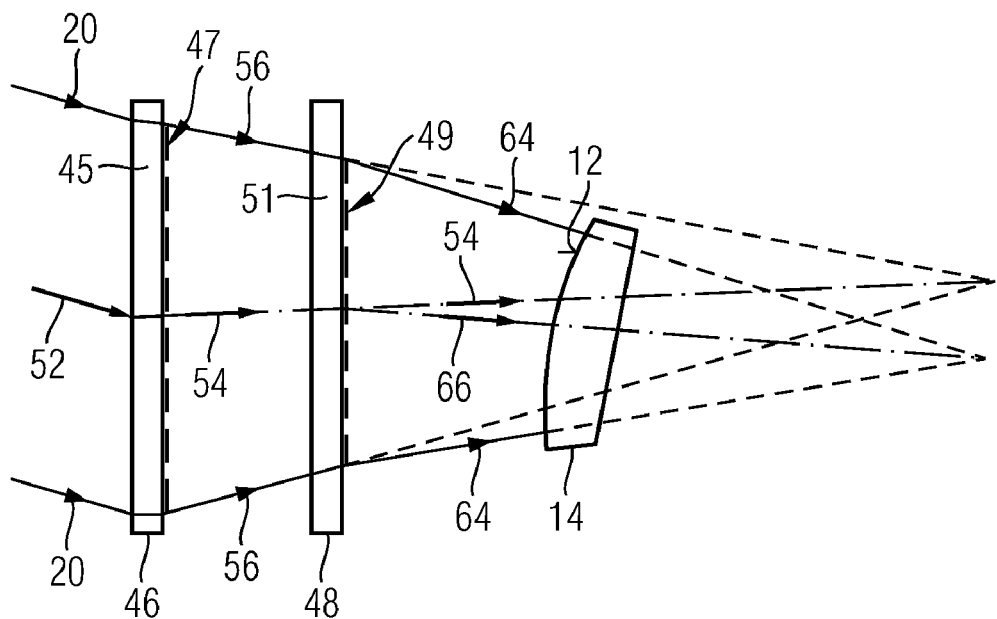
FIG. 3 the region of the measuring apparatus according to FIG. 2 in a measuring mode with the first diffractive element and a second diffractive element.

In the measuring mode illustrated in FIG. 3, the calibration sphere 50 is pivoted out of the optical path of the approximated measuring wave 56 and instead, the second diffractive element 48 and the specimen 14 are moved into the optical path. The second diffractive element 48 comprises a second diffractive structure 49 disposed on a second substrate 51. The optical surface 12 of the specimen 14 has an aspherical form which, for example, has a maximum gradient deviation in relation to its best-fitting sphere of 1°. In order to be able to measure the actual shape of the optical surface 12 precisely, the wavefront of the approximated measuring wave 56, the wavefront of which already has the shape of the best-fitting sphere of the optical surface 12, need only be changed slightly. This happens by means of the second diffractive element 48 disposed in the optical path of the approximated measuring wave 56 the diffractive structure 49 of which is also designed in the form of a computer-generated hologram (CGH).

The approximated measuring wave 56 passes through the second diffractive element 48 and is thus converted into an adapted measuring wave 64 the wavefront of which corresponds to the desired shape of the optical surface 12. In the example specified above in which the maximum deviation of the desired shape of the optical surface 12 is 1° in relation to the best-fitting sphere, the CGH of the second diffractive element 48 only has a band density of 28 lines/mm. A CGH with such a small line density can be qualified with high precision. Since, as already described above, the wavefront of the approximated measuring wave 56 has already been calibrated absolutely, the actual form of the wavefront of the adapted measuring wave 64 is known with high precision. When passing through the second diffractive element 48 the approximated measuring wave 56 is deflected. The propagation direction 54 of the approximated measuring wave 56 and the propagation direction 66 of the adapted measuring wave 64 enclose an angle of approximately 7°. In this way one prevents reflections from the surface of the second wavefront element 48 from falsifying the measurement result.

In autocollimation the adapted measuring wave 64 strikes the optical surface 12 and is reflected on the latter. Thereupon, the reflected wave passes back through the second diffractive element 48 and the first diffractive element 46 into the interferometer 16 as a returning measuring wave 67. The returning measuring wave 67 interferes with the reference wave 40 on the recording surface 58, and so produces an interferogram. The interferogram is analysed by means of the analysis device 62 taking into account the previously determined calibration deviation of the actual wavefront of the approximated measuring wave 56 from its desired wavefront. As a result of the analysis the deviation of the actual shape of the optical surface 12 from its desired shape is established.

Figure 4A:
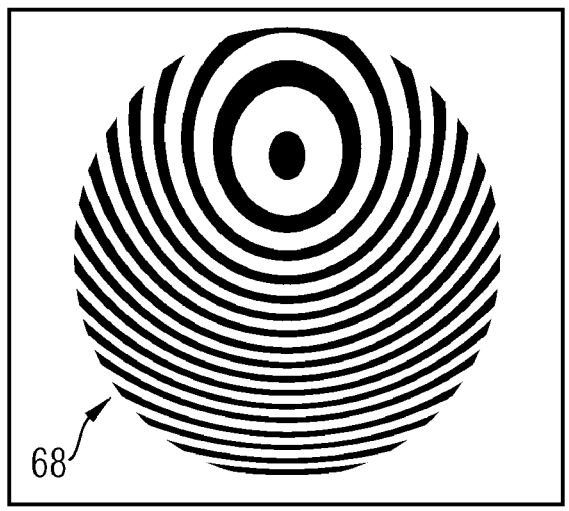
FIG. 4a an exemplary band pattern on the first diffractive element according to FIG. 3.
Figure 4B:
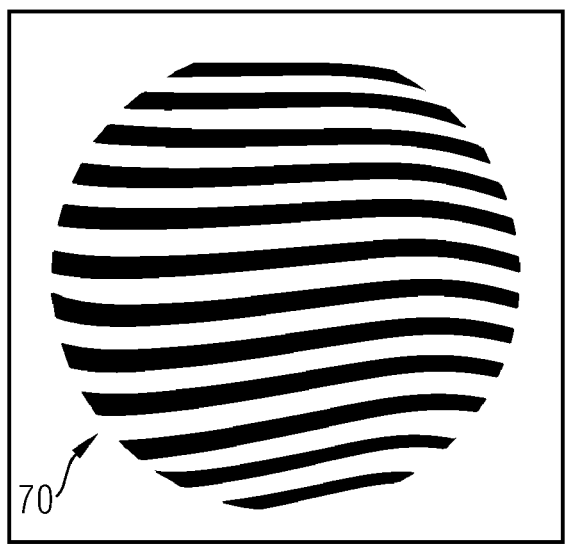
FIG. 4b an exemplary band pattern on the second diffractive element according to FIG. 3.

FIG. 4a shows an example of a band pattern 68 on the CGH of the first diffractive element 46 according to FIGS. 1 to 3. FIG. 4b shows an example of a band pattern 70 on the CGH of the second diffractive element 48 according to FIGS. 1 to 3. The measuring apparatus 10 according to FIGS. 1 to 3 can be provided in an alternative embodiment with a first diffractive element 46 which reshapes the incoming measuring wave 20 to form an approximated measuring wave 56 with an aspherical wavefront, the cross-section of the aspherical wavefront having the shape of a conic section. In this case, instead of the calibration sphere 50 a calibration object is used which has a surface corresponding to the wavefront of the approximated measuring wave 56 and so has approximately the form of an ellipsoid, a paraboloid or a hyperboloid. With this type of measuring apparatus one can measure particularly well optical surfaces the form of which differs only slightly from the surface of an ellipsoid, a paraboloid or a hyperboloid.

Figure 5:
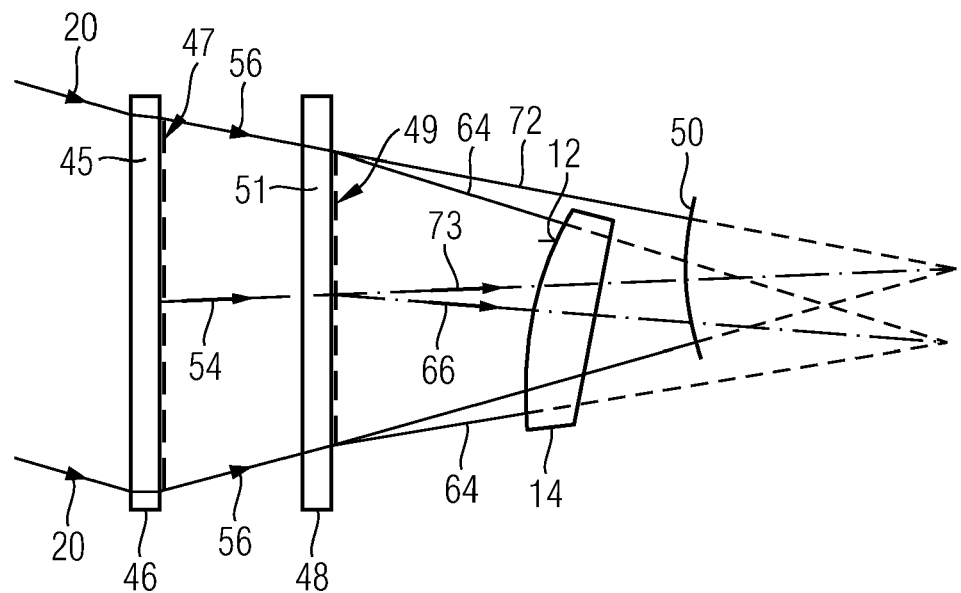
FIG. 5 region II according to FIG. 1 of a further embodiment according to the invention of an interferometric measuring apparatus in a representation illustrating both a calibration mode and a measuring mode of the measuring apparatus.

FIG. 5 shows region II according to FIG. 1 of a measuring apparatus 10 in a further embodiment according to the invention. This embodiment differs from the embodiment according to FIG. 1 in that the approximated measuring wave 56 produced by the first diffractive element 46 has an aspherical wavefront instead of a spherical wavefront. This wavefront is formed such that after passing through the second diffractive element 48 in the zeroth diffraction order it has a spherical wavefront. In the following this wave will be called the calibration wave 72. Alternatively, the calibration wave 72 can also have the shape of a conic section. The calibration wave 72 is measured by means of the calibration sphere 50, for this purpose the specimen 14 being pivoted out of the optical path of the calibration wave 72. In the case where the calibration wave 72 has a wavefront the form of which corresponds to an ellipsoid, a paraboloid or a hyperboloid, the form of the calibration sphere is adapted to the latter. The calibration of the first diffracted element 46 is implemented in accordance with the calibration according to FIG. 2, the difference being that the reshaping of the approximated measuring wave 56 to form the calibration wave 72 as it passes through the second diffractive element 48 in the zeroth diffraction order is taken into account during calibration.

The m-th diffraction order of the approximated measuring wave 56 after passing through the CGH of the second diffractive element 48 serves as an adapted measuring wave 64. The adapted measuring wave 64 is reflected in the same way as the measurement according to FIG. 3 on the optical surface 12.

Figure 6:
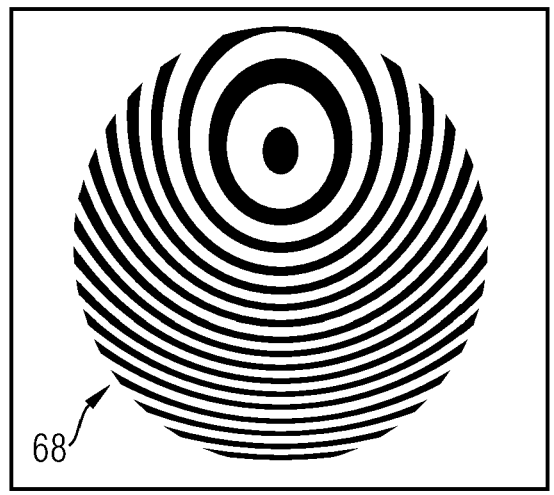
FIG. 6 a band pattern on a first diffractive element according to FIG. 5.
Figure 7:
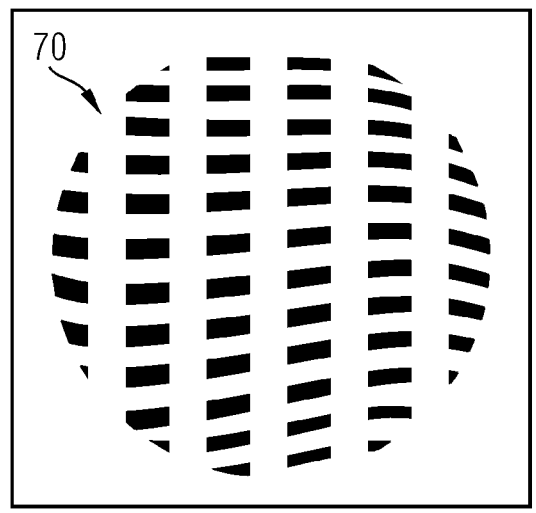
FIG. 7 a band pattern on a second diffractive element according to FIG. 5.

FIG. 6 shows an example of a band pattern 68 of the CGH of the first diffractive element 46 according to FIG. 5. FIG. 7 shows an example of a band pattern 70 of the second diffractive element 48 according to FIG. 5. In an alternative embodiment the second diffractive element 48 according to FIG. 5 can also be in the form of a twice-encoded CGH which has two CGH structures independent of one another. Here a first CGH structure converts the approximated measuring wave 56 into the calibration wave 72 and the second CGH structure into the adapted measuring wave 64.

Figure 8:
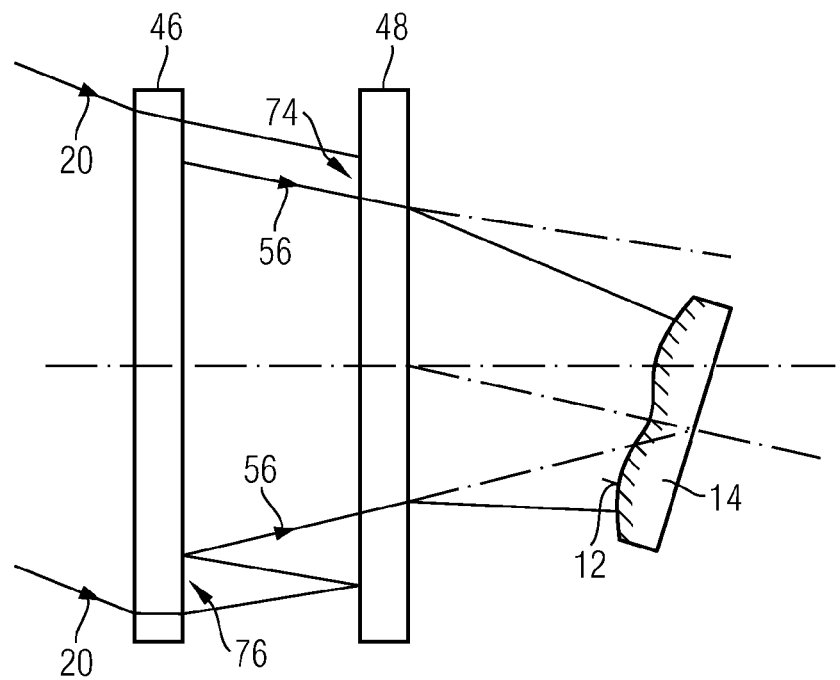
FIG. 8 an illustration of the adjustment of the two diffractive elements by means of the embodiment according to FIG. 5.
Figure 9:
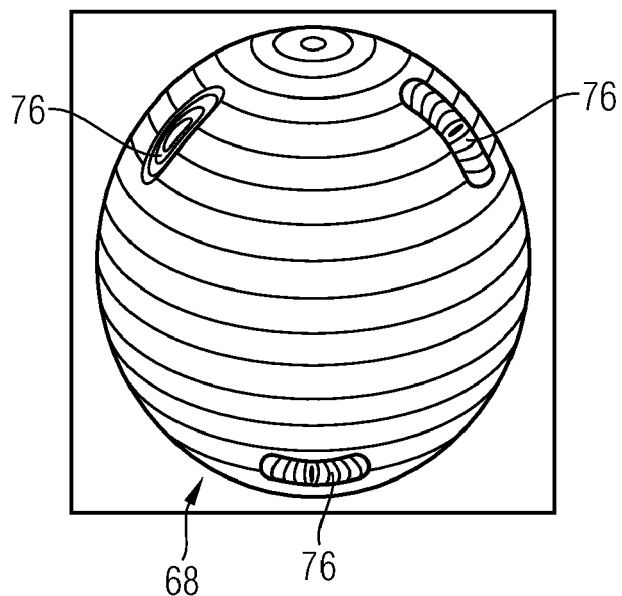
FIG. 9 an illustration of an embodiment of an adjustment pattern on the first diffractive element according to FIG. 8.
Figure 10:
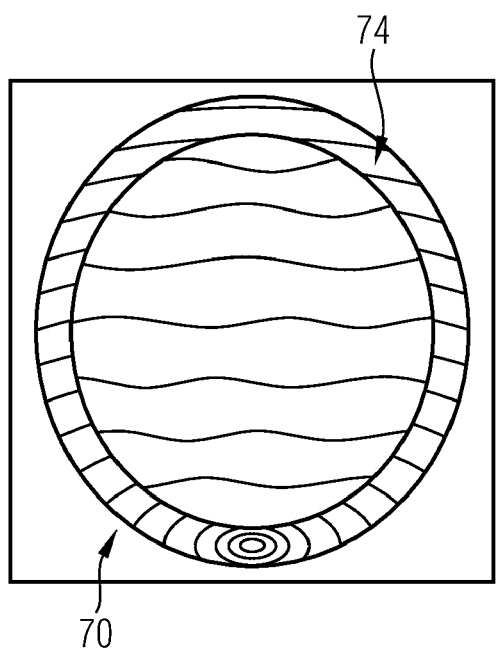
FIG. 10 an illustration of an embodiment of an adjustment pattern on the second diffractive element according to FIG. 8.

FIG. 8 illustrates as an example the adjustment of the diffractive element 46 and 48 according to FIG. 3. The adjustment of the first diffractive element 46 in relation to the incoming measuring wave 20 can be implemented, for example, by means of a Littrow grating not shown in the drawings. The positioning of the second diffractive element 48 in relation to the first diffractive element 46 can be implemented by means of a further Littrow grating 74 disposed in the peripheral region of the second diffractive element 48 and/or by means of cat eye structures 76 disposed in the peripheral region of the first diffractive element 46. FIG. 9 illustrates the cat eye structures 76 in the band pattern 68 of the CGH of the first diffractive element 46. FIG. 10 illustrates the Littrow grating 74 which is disposed annularly in the peripheral region of the second diffractive element 48, in the band pattern 70 of the CGH of the second diffractive element 48. The cat eye structures 76 serve to control the tilt angle and the distance between the two diffractive elements 46 and 48, and the Littrow grating 74 serves to control the decentration between the two diffractive elements 46 and 48.

Figure 11:
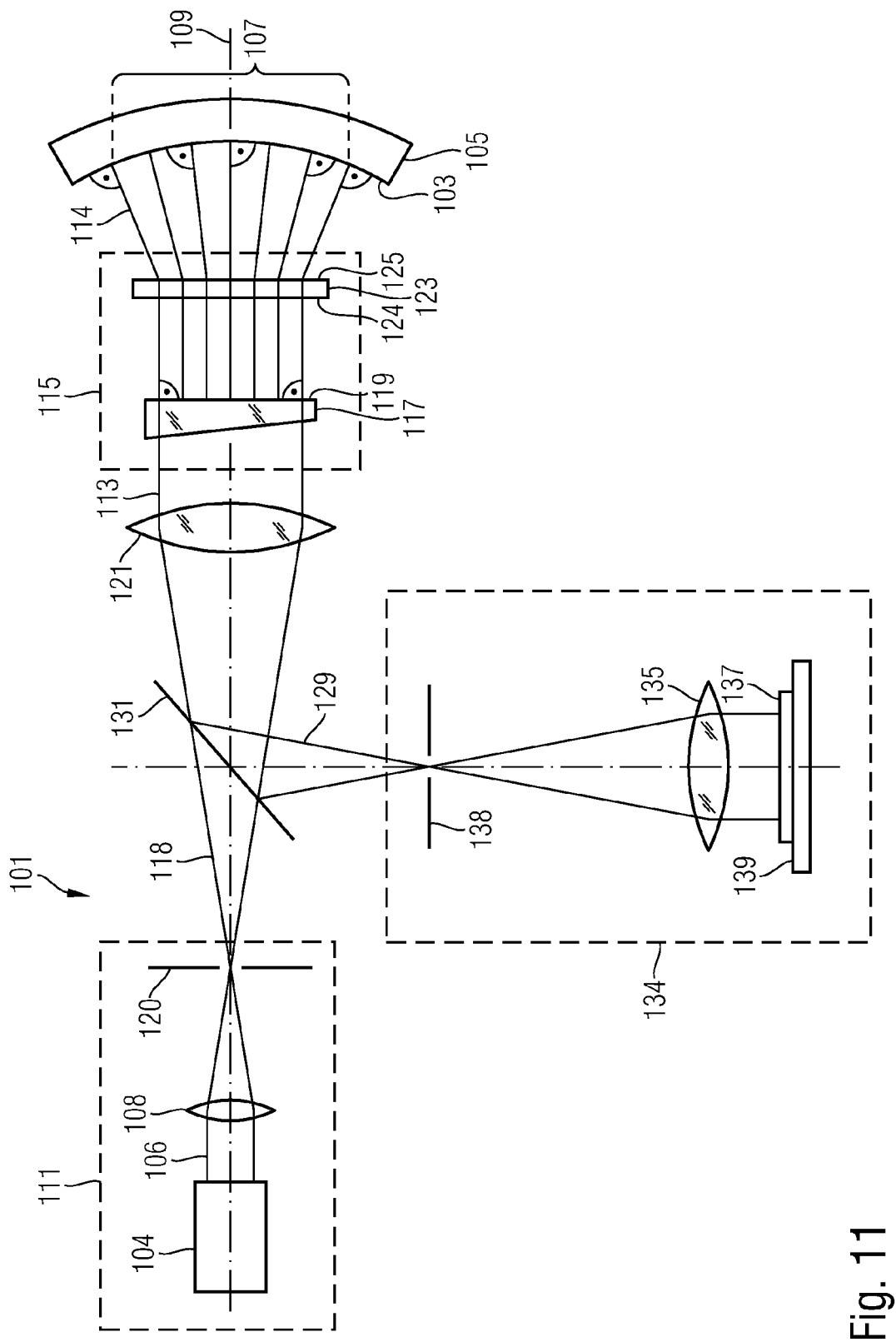
FIG. 11 a diagrammatic illustration of an interferometer arrangement in the form of an interferometric measuring apparatus according to a further embodiment of the invention.

FIG. 11 shows in a diagrammatic illustration an interferometer arrangement 101. This serves to measure a surface region 107 of an aspherical mirror surface 103 of a mirror 105. The mirror 105 is disposed in an optical path of the interferometer arrangement 101 at a pre-specified test position by means of a holder not shown in FIG. 11.

The interferometer arrangement 101 comprises a light source for producing measuring radiation. The light source 111 can comprise a helium-neon laser 104 which produces a laser beam 106. The beam 106 is focussed by a focussing lens 108 onto a hole in a spatial filter 120 so that a divergent beam 118 of coherent light emerges from this hole. Wavefronts of the divergent beam 118 are substantially spherical wavefronts. The divergent beam 118 emitted by the light source is collimated by one or more lenses 121 in order to form a parallel beam 113 of measuring light in which the wavefronts of the measuring light are substantially planar wavefronts. The beam 113 is conveyed to interferometer optics 115 and passes through the latter, the interferometer optics 115 reshaping the beam 113 to form a measuring light beam 114 such that these wavefronts are of a form such that the form of the wavefronts of the beam 114 at the location of the aspherical mirror surface 103 substantially corresponds to a desired form of the mirror surface 103. Therefore the measuring radiation 114 strikes the surface 103 substantially orthogonally at each location of the region 107. If the form of the mirror surface 103 deviates from its desired form, the angle of incidence of the measuring radiation deviates from the orthogonal angle of incidence, and this is detectable with a high degree of sensitivity by the interferometer arrangement 101. It is then possible to process the mirror surface 103 further upon the basis of the measurement result in order to approximate the form of the surface 103 to the desired form or desired shape of the latter.

Due to the substantially orthogonal incidence on the mirror surface 103 the measuring light reflected on the mirror surface 103 passes along a path back to the interferometer optics 115 which substantially coincides with the path which the light has previously taken from the interferometer arrangement 115 to the surface 103.

After passing through the interferometer arrangement 115 the light reflected on the mirror surface 103 is partially reflected on a beam splitter 131 which is disposed in the divergent beam 118 of the measuring light. A beam 129 of the measuring light reflected on the mirror surface 103 reflected on the beam splitter 131 passes through a spatial filter 138 which has an opening, and a part of the beam 129 passing through the spatial filter 138 is guided through an objective 135 onto a light-sensitive surface 137 of a camera chip 139 of a camera 134 so that the part 107 of the mirror surface 103 is imaged onto the camera 134.

The interferometer optics 115 comprise a slightly wedge-shaped substrate 117 with a flat surface 119 which is orientated substantially orthogonally or at a slight angle relative to the parallel beam 113 of the measuring light which has passed through the substrate 113. The surface 119 thus forms a Fizeau surface of the interferometer system 101 by reflecting part of the beam 113 as reference light for the interference process. The reference light reflected back by the Fizeau surface 119 is partially also reflected on the beam splitter 131 and overlaid on the light-sensitive surface 137 of the detector 134 with the measuring light reflected on the mirror surface 103. From an interference pattern produced with this overlaying, after suitable analysis deviations, in the form of the mirror surface 103 from the desired form of the latter can be established in order to plan appropriate re-processing of the mirror surface 103.

As described above, the interferometer optics 115 are configured such that they convert the incoming beam 113, the measuring light of which has substantially parallel wavefronts, into the beam 114, the light of which has aspherical wavefronts, the form of which corresponds substantially to the desired form of the optical surface at the location of the optical surface 103. For this purpose the interferometer optics 115 comprise a substrate 123 with two parallel planar surfaces 124 and 125, the surface 125 supporting a diffraction grating. The diffraction grating is a computer-generated hologram (CGH) which is designed such that it diffracts the beam 113 with the planar wavefronts such that wavefronts of measuring light which is diffracted on the diffraction grating 135 under pre-specified diffraction orders, are aspherical wavefronts the form of which corresponds to the desired form of the latter at the location of the mirror surface 103.

The diffraction grating can have e.g. a diameter of more than 10 mm, preferably more than 50 mm, and in particular more than 100 mm. A diameter of the object to be measured, in the present example of the mirror surface 103, can be more than 100 mm, and in particular more than 150 mm. In particular, provision is made here such that the object to be measured has a diameter which is greater than the diameter of the diffraction grating. For example, the diameter of the object can be 1.5 times or 2.0 times greater than the diameter of the diffraction grating.

The spatial filter 138 of the detector 134 serves to prevent undesired measuring light from striking the light-sensitive surface 137 of the detector chip 139. The undesired measuring light can include measuring light which is reflected by surfaces of the interferometer optics 115 which are different from the Fizeau surface 119, such as for example measuring light which is reflected on the surface of the substrate 117 lying opposite the Fizeau surface 119. Furthermore, the spatial filter 138 should absorb undesired measuring light which is diffracted by the diffraction grating 125 under diffraction orders which are different from the diffraction orders which produce the measuring beam 114 with the desired aspherical wavefronts.

Figure 12:
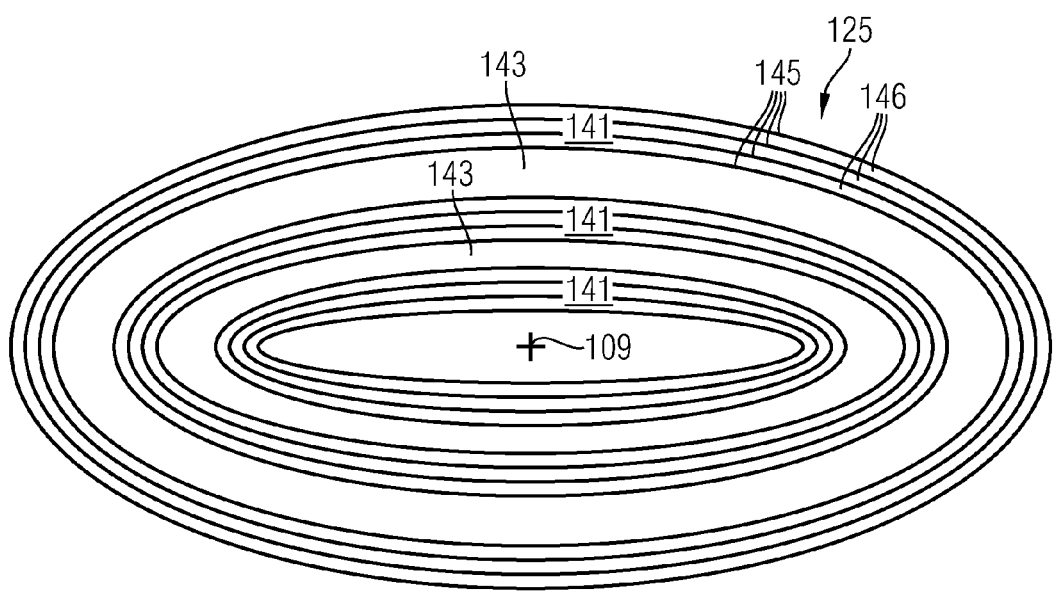
FIG. 12 a diagrammatic top view of a diffractive element in the form of a diffraction grating used in the interferometer arrangement of FIG. 11.
Figure 13:
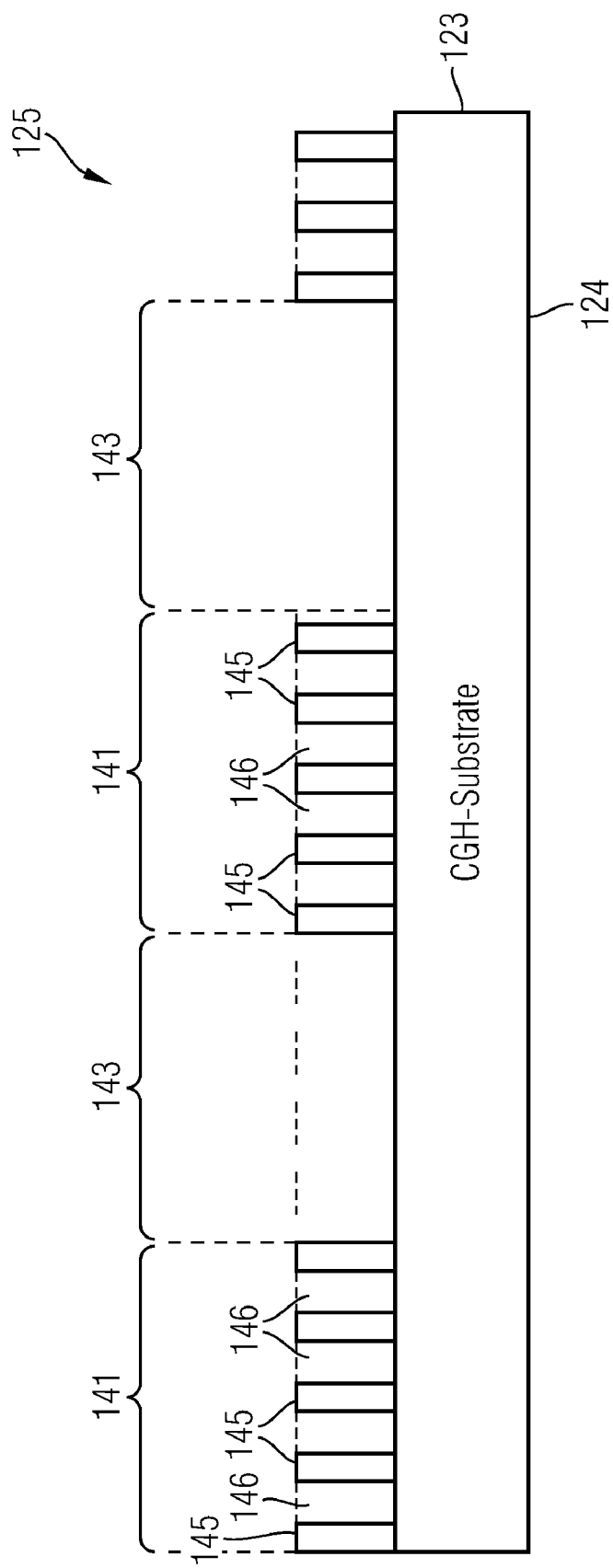
FIG. 13 a diagrammatic illustration of a cross-section through part of the diffraction grating shown in FIG. 12.

A configuration of the diffraction grating 125 is diagrammatically illustrated in a top view in FIG. 12 and in a cross-section in FIG. 13.

The diffraction grating 125 comprises a plurality of diffraction elements 145, 146 which are arranged distributed over the surface of the diffraction grating 125. The individual diffraction elements 145, 146 respectively have an elongated form and, as viewed laterally to the extension directions of the latter, are positioned alternately one next to the other. The diffraction elements 145 and 146 differ with regard to their optical properties on the measuring light passing through the diffraction grating 125. It can be seen from the cross-section of FIG. 13 that the diffraction elements 145 are in the form of material bars provided on the substrate 123, whereas the diffraction elements 146 are in the form of gaps formed between adjacent bars 145. A height of the bars 145 is dimensioned here such that measuring radiation which passes through the substrate 123 and one of the bars 145 experiences a phase displacement of half the wavelength $\lambda$ of the measuring radiation relative to the measuring radiation which passes through the substrate 123 and one of the gaps 146. Therefore, the diffraction elements 145, 146 positioned alternately one next to the other form a first diffractive structure in the form of a phase grating for the measuring radiation.

Furthermore, the diffraction grating 125 is divided into bands 141 and 143 positioned adjacent to one another and which also differ with regard to their optical effect upon the measuring radiation and in particular with regard to an arrangement period of the diffraction elements 145, 146. In the embodiment shown in FIG. 13 the bands 141 and 143 differ in that within the bands 141 the diffraction elements 145 and 146 are positioned adjacent to one another, whereas the bands 143 are free of diffraction elements 145, 146. It is clear that the bands 141 and 143 differ as regards their optical effect upon the measuring radiation, and this is why the periodically alternating arrangement of the bands 141, 143 one next to the other also has the effect of an optical grating upon the measuring radiation. In the following this optical grating is called the second diffractive structure. Since the bands 141 and 143 are formed by different arrangement patterns of the diffraction elements 145, 146, the arrangement of the bands 141, 143 can also be called over-gratings of the grating formed by the diffraction elements 145, 146.

Figure 14A:
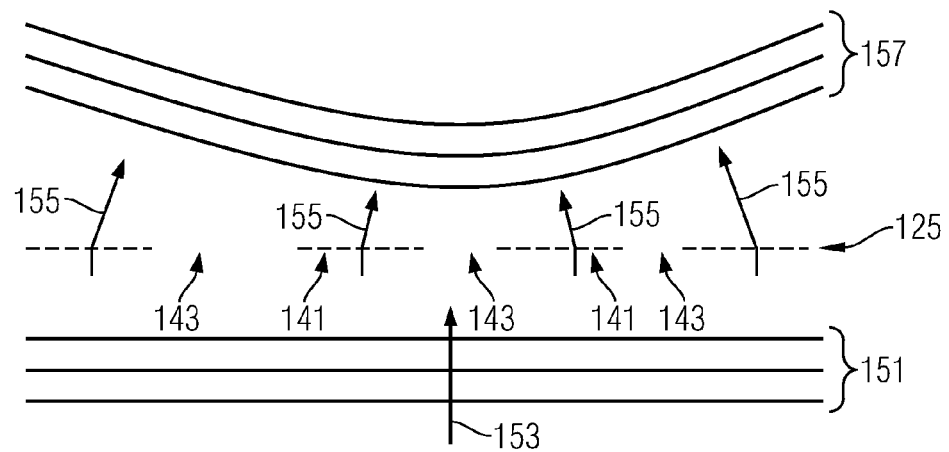
FIGS. 14a and 14b an effect of the diffraction grating shown in FIGS. 12 and 13 upon wavefronts of measuring radiation of the interferometer arrangement of FIG. 11, FIG. 15 graphs representing phase functions of the diffraction grating shown in FIGS. 11 and 12.
Figure 14B:
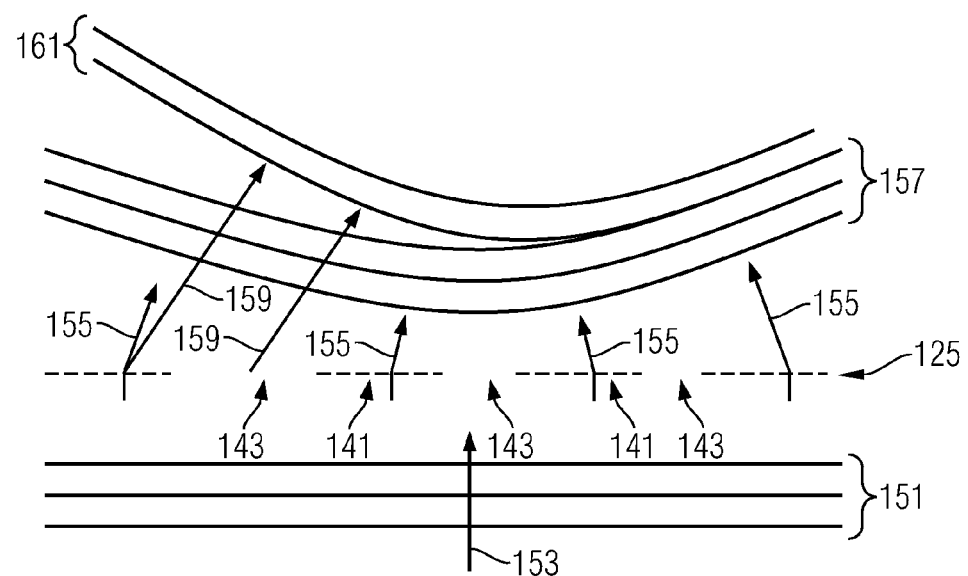

The measuring radiation passing through the diffraction grating 125 therefore experiences diffraction on the grating formed by the adjacent arrangement of the diffraction elements 145, 146 and further diffraction on the over-grating formed by the adjacent arrangement of the bands 141, 143. In the following this is explained with reference to FIGS. 14a and 14b. In FIG. 14a reference number 151 identifies a group of planar wavefronts of the beam 113 and reference number 153a propagation direction of the light of the beam 113. Light which strikes the grating formed by the diffraction elements 145, 146 within the bands 141 is diffracted on this grating from the diffraction elements 145, 146 under a given diffraction order as indicated by arrows 155 in FIG. 14a. In FIG. 14a reference number 157 identifies a group of wavefronts of light which is only diffracted by the grating formed by the elements 145, 146 and is not effected by the over-grating formed by the bands 141, 143. FIG. 14b is a supplemented illustration in relation to FIG. 14a in which diffraction on the over-grating formed by the bands 141, 143 is taken into consideration. This diffraction leads to a further deflection of the light passing through the diffraction grating 125, as indicated in FIG. 14b by the arrows 159 and leads to additional deformation of wavefronts, in FIG. 14b reference number 157 indicating as in FIG. 14a a group of wavefronts which only arise on light diffracted on the grating formed by the diffraction elements 145, 146, whereas reference number 161 in FIG. 14b indicates a group of wavefronts which are produced by light which is diffracted both on the grating formed by the diffraction elements 145, 146 and on the over-grating formed by the bands 141, 143.

The effects, in particular wavefront-forming effects, i.e. phase changes, of the grating formed by the elements 145, 146 and of the over-grating formed by the bands 141, 143 upon the measurement radiation add up linearly. A phase function of the diffraction grating 125 can therefore be described by the following equation:

$$\phi_{GGH} = m_1 \cdot \phi_1 + m_2 \cdot \phi_2$$

where $\phi_{CGH}$ represents the phase function of the diffraction grating 125

$\phi_1$ represents the phase function of the grating formed by the diffraction elements 145, 146, $\phi_2$ represents the phase function of the over-grating formed by the bands 141, 143, and $m_1$ and $m_2$ whole numbers respectively of $m_1$ and $m_2$ can be positive or negative whole numbers including 0 which represent the diffraction order of the diffraction on the grating or over-grating.

Figure 15:
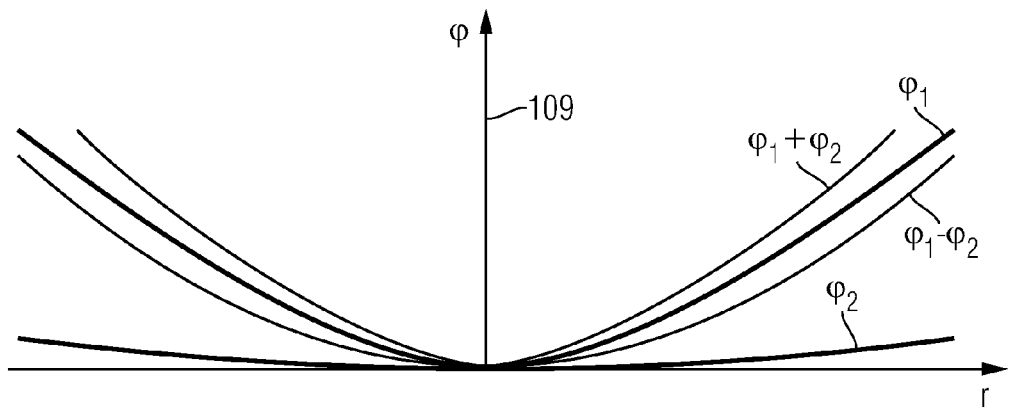

FIG. 15 shows graphs of the functions $\phi_1$, $\phi_2$, $\phi_1 + \phi_2$ and $\phi_1 - \phi_2$ representable by the above formula. In FIG. 15 these functions are symmetrical to an axis which coincides with an optical axis of the interferometer optics 115 and an axis of symmetry 109 of the aspherical surface 103 due to the symmetry of the diffraction grating 125. Due to the smaller period of the grating formed by the diffraction elements 145, 146 a gradient of the function $m_{1\phi1}$ (e.g. for the value $m_1$=1) is steeper than a gradient of the function $m_{2\phi2}$ (for example also for the value $m_2$=1).

According to one embodiment of the invention the phase functions $\phi_1$ and $\phi_2$ of the grating and of the over-grating of the diffraction grating 125 are coordinated with one another such that for a pre-specified combination of the values of $m_1$ and $m_2$ (for example $m_1$=$m_2$=1) the function $m_{1\phi1}$+$m_{2\phi2}$ is aspherical in form such that the wavefronts of the radiation diffracted according to this phase function are of a form such that they are of a form at the location of the object to the measured, namely the aspherical mirror surface 103 in FIG. 11, which corresponds to the desired surface form of the object to be measured. Therefore, these wavefronts can be used for measuring the object with an aspherical surface.

Furthermore, the functions $\phi_1$ and $\phi_2$ are configured such that for a further pre-specified combination of the values of $m_1$ and $m_2$ (for example $m_1$=1 and $m_2$=−1) the function $m_{1\phi1}$+ $m_{2\phi2}$ leads to spherical wavefronts. If a reference body with a spherical reference surface is disposed in the optical path of the interferometer arrangement 101 of FIG. 11 such that the wavefronts then produced according to the function $m_{1\phi1}$+ $m_{2\phi2}$ at the location of the reference surface substantially correspond with the form of the reference surface, the actual gradient of the function $m_{1\phi1}$+$m_{2\phi2}$ can then be deduced from the detected interference patterns. This gradient in turn is composed of the functions $m_{2\phi2}$ and $m_{1\phi1}$. Here, $m_{2\phi2}$ is determined by the over-grating from the bands 141, 143. The gradient of function $m_{2\phi2}$ can be predicted relatively precisely upon the basis of the comparably large period of the over-grating by means of calculations upon the basis for example of a scalar diffraction theory. Therefore, the component $m_{1\phi1}$ can be calculated from the experimental determination of $m_{1\phi1}$+$m_{2\phi2}$. Under certain circumstances this is possible in this way with greater precision than from a purely theoretical deduction, not supported by a measurement, of the function $m_{1\phi1}$ upon the basis of diffraction calculations on a model of the grating formed by the diffraction elements 145, 146. In fact in comparison with the over-grating and the wavelength $\lambda$ of the measuring light used this has a small grating period, for grating periods which are not substantially greater than the diffracted light conventional calculation methods for determining the diffraction on the grating being defective. Therefore, from the theoretical determination of $m_{2\phi2}$ and the experimental determination of $m_{1\phi1}$ the gradient of the function $m_{1\phi1}$+$m_{2\phi2}$ can be deduced comparably precisely. By means of $m_{1\phi1}$+$m_{2\phi2}$ the form of the wavefronts which are used for measuring the aspherical surface 103 is determined.

If, as in the above example, the desired wavefront of the measuring wave produced when calibrating the aforementioned diffractive structures in the form of the measuring radiation beam has a phase function $\phi_{sph}$ which is spherical in form and the adapted measuring wave used for measuring the optical surface has a phase function $\phi_{asp}$ which is aspherical in form, the phase functions $\phi_1$ and $\phi_2$ are produced as follows:

$\phi_1 = \frac{1}{2}(\phi_{asp} + \phi_{sph})$ $\phi_2 = \frac{1}{2}(\phi_{asp} - \phi_{sph})$ With the method described it is therefore possible to produce aspherical wavefronts approximately with a desired form and the actual form of the latter with comparably high precision. Precision of the wavefront-forming effect of the diffraction grating can e.g. be smaller than 1 nm and in particular smaller than 0.5 nm. In an interferometric measurement of the aspherical surface deviations between the actual form of the wavefronts and the actual form of the aspherical surface can then be established, from which in turn it is possible to establish deviations between the actual form of the aspherical surface and the desired form of the aspherical surface. Upon the basis of these deviations further shaping processes can then be undertaken on the optical surface.

Figure 16:
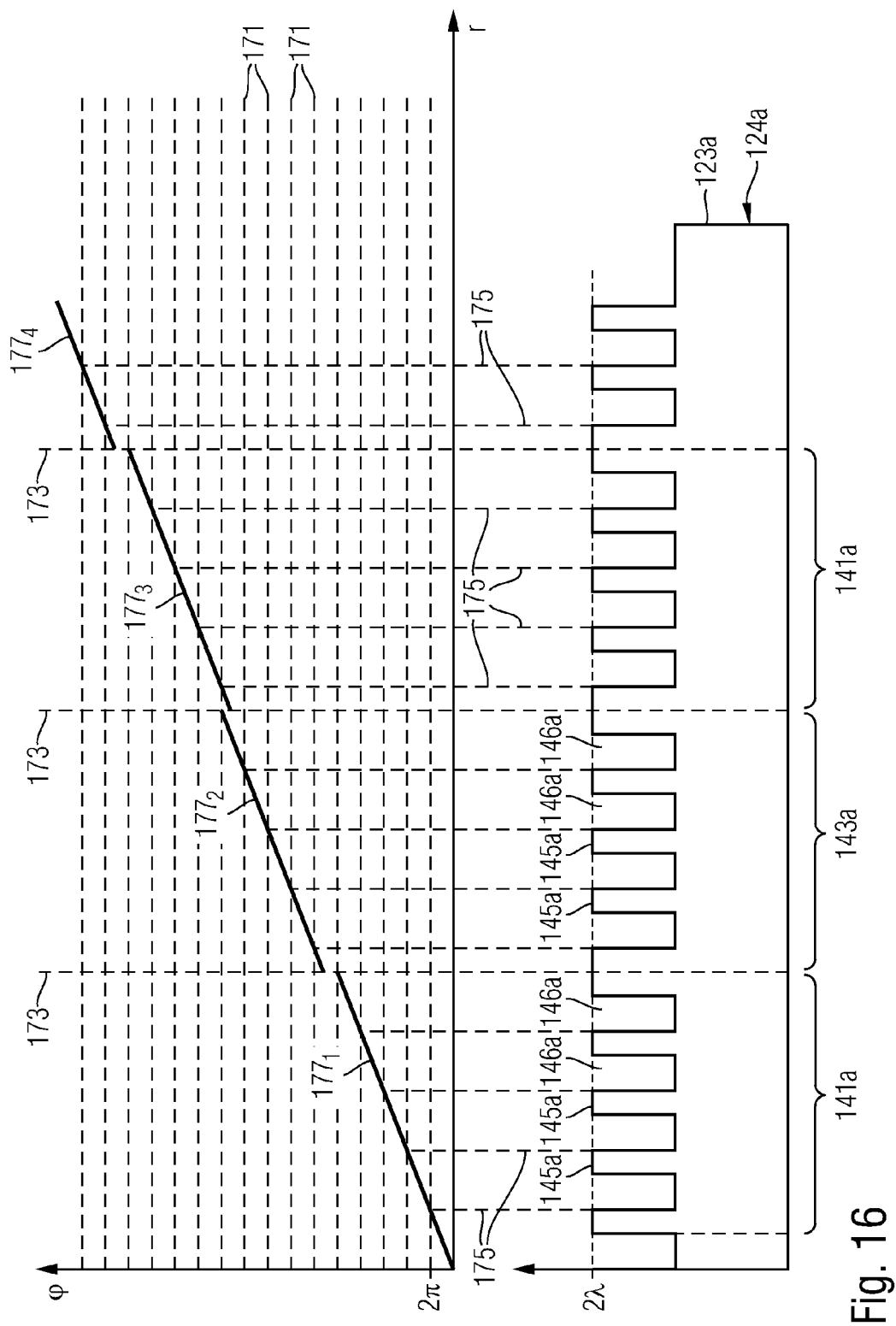
FIG. 16 a diagrammatic illustration of a cross-section of an alternative embodiment of the diffraction grating shown in FIGS. 12 and 13.

The bottom section of FIG. 16 shows a cross-section of a further embodiment of a diffraction grating. The diffraction grating 124*a* shown at the bottom of FIG. 16 has a similar structure to the diffraction grating described above, and illustrated as a cross-section in FIG. 13. The diffraction grating 124*a* is also composed of bands 141*a* and 143*a* which differ with regard to their optical effect upon the measuring radiation, and in particular with regard to their arrangement period of diffraction elements 145*a* and 146*a*. Unlike the diffraction grating illustrated in FIG. 13, the diffraction grating 125*a* is provided both in bands 141*a* and 143*a* with diffraction elements 145*a* and 146*a* positioned adjacent to one another. These differ, however, with regard to a phase of their arrangement pattern. In order to illustrate this, in the top part of FIG. 16 the phase function of the diffraction grating 124*a* in the radial direction r is shown. Horizontal lines 171 at the top of FIG. 16 represent constant phases $\phi$ with values which are whole-number multiples of $2\pi$. Vertical lines 173 at the top of FIG. 16 represent boundaries between the bands 141*a* and 143*a*. The phase function is represented by curve segments 177$_1$, 177$_2$, 177$_3$, 177$_4$ and defines the arrangement of the diffraction elements 145*a* and 146*a*. In the example illustrated in FIG. 16 the diffraction elements 145*a*, 146*a* are arranged such that at locations r where the phase function 177$_1$ ... 177$_4$ intersects a whole-number multiple of $2\pi$, a radially outer edge of a grating bar 145*a* is disposed. The correlation between the intersection points of the phase function with whole-number multiples of $2\pi$ and the radially outer edges of the bars 145*a* is illustrated in FIG. 16 by lines 175.

It is clear that within bands 141*a*, 143*a* the diffraction elements 145*a*, 146*a* are periodically arranged, and this is why the curve segments 177$_1$ ... 177$_4$ are respectively continuous straight lines. At the boundaries 173 between the bands 141*a* phase jumps take place, however, and it is not possible here to continue the phase function while maintaining the periodic arrangement of the diffraction elements continuously from one band into the other band. The value of the phase jump between the bands 141*a*, 143*a* is approximately 1.5$\pi$ since with the chosen embodiment two bars 145*a* are respectively adjacent to one another at the boundaries 173 between the adjacent bands 141*a*, 143*a* or in this way a common bar with double the bar width is formed. With other embodiments it is possible for the phase jump to have other values, and in particular it is also possible to configure a diffraction grating such that the phase jump between adjacent bands has an approximate value of 1.0$\pi$.

Therefore, the arrangement patterns of the diffraction elements 145*a*, 146*a* differ from one another in the bands 141*a* and 143*a* in that the latter are disposed phase-displaced in relation to one another. Therefore, the over-grating of the bands 141*a*, 143*a* has the effect of a phase grating upon the measuring radiation passing through the diffraction grating 125*a*.

Figure 17:
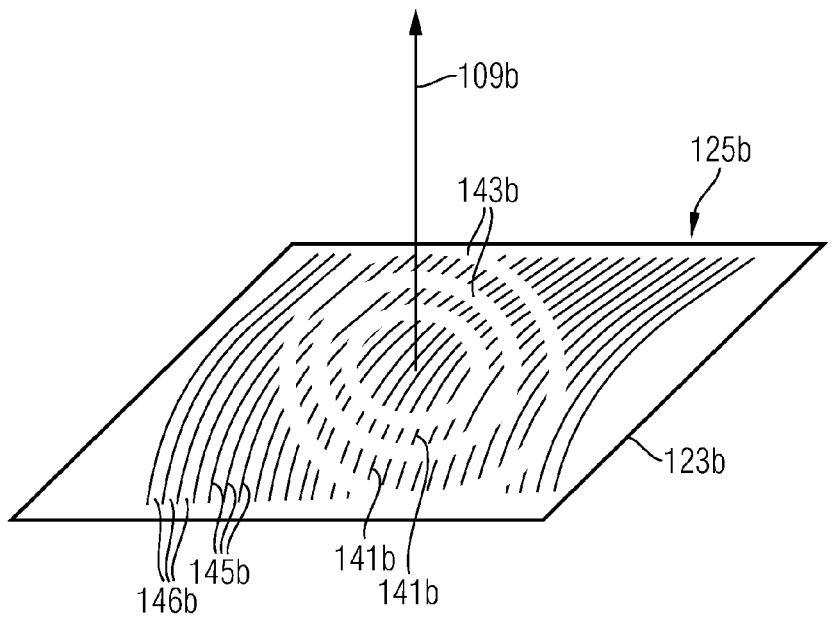
FIG. 17 a diagrammatic perspective illustration of a further alternative embodiment of the diffraction grating shown in FIGS. 12 and 13.

FIG. 17 shows a further embodiment of a diffraction grating. The diffraction grating 125*c* shown in FIG. 17 differs from the diffraction grating explained by FIGS. 12 and 13 in that elongated diffraction elements 145*b*, 146*b*, which are positioned alternately one next to the other, do not have any symmetry in relation to a main axis 119*b*. This type of grating is also called a carrier frequency hologram. The diffraction grating 125*c* also comprises bands 141*b* and 143*b* which in an illustrated embodiment are, however, arranged symmetrically in relation to the main axis 109b. The bands 141b and 143b differ from one another with regard to an arrangement pattern of diffraction elements 145b, 146b in that the diffraction elements 145b, 146b are only arranged in the bands 141b, whereas the bands 143b are free of diffraction elements 145b, 146b.

Figure 18:
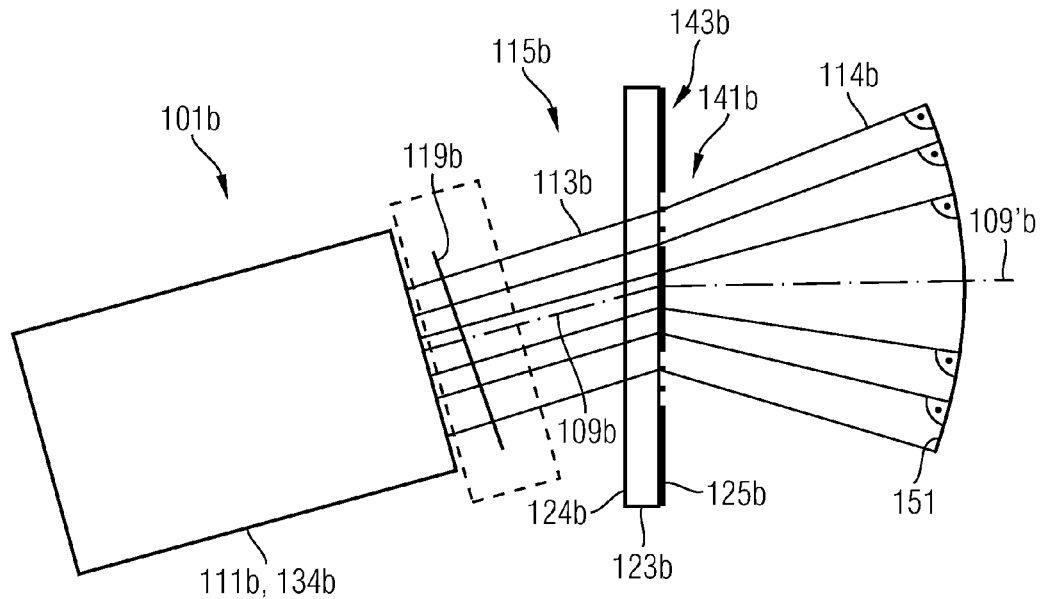
FIG. 18 a diagrammatic illustration of an interferometer arrangement according to a further embodiment of the invention, a reference body with a spherical surface being disposed in an optical path of the interferometer.

FIG. 18 shows an interferometer arrangement 101b in a greatly simplified diagrammatic illustration which can have a similar structure to the interferometer arrangement shown in FIG. 11. The interferometer arrangement 101b also comprises a radiation source 111b and a detector 134b which are not shown in detail in FIG. 18.

Interferometer optics for producing a measuring light beam 114b comprise a Fizeau surface 119b and a diffraction grating 125b which is applied to a substrate 123b on a surface lying opposite a surface 124b. The diffraction grating 125b has a structure as diagrammatically illustrated in FIG. 17. Here diffraction elements 145b, 146b are positioned alternately one next to the other with a high line density so as to form a carrier frequency hologram. This leads to a light beam 113b striking the diffraction grating 125b, observed through the diffraction grating, being deflected over the whole beam cross-section. This can be seen in FIG. 18 by a main axis 109b of the incoming beam 113b extending at an angle in relation a main axis 109' b of the beam 114b passing out of the diffraction grating 125b. Furthermore, the diffraction grating 125b has an over-grating of bands 141b, 143b arranged adjacent to one another which also differ with regard to their optical properties so that the light of the incoming beam 113b is diffracted both on the grating formed by the diffraction structures 145b, 146b and on the over-grating formed by the bands 141b, 143b. The grating and the over-grating are configured as explained above by means of FIG. 15 so that measuring light, which has been diffracted on the grating under a pre-specified diffraction order and on the over-grating under a pre-specified diffraction order, has spherical wavefronts so that this measuring light strikes a spherical reference surface 151 disposed in an optical path of the interferometer arrangement 101b orthogonally. The spherical reference surface 151 has previously been produced with high precision and calibrated using an independent, conventional measuring method. As explained in connection with FIG. 15 the effect of the grating formed by the diffraction structures 145b, 146b can be calculated from the measurement on the spherical reference surface 151 with comparably high precision.

Figure 19:
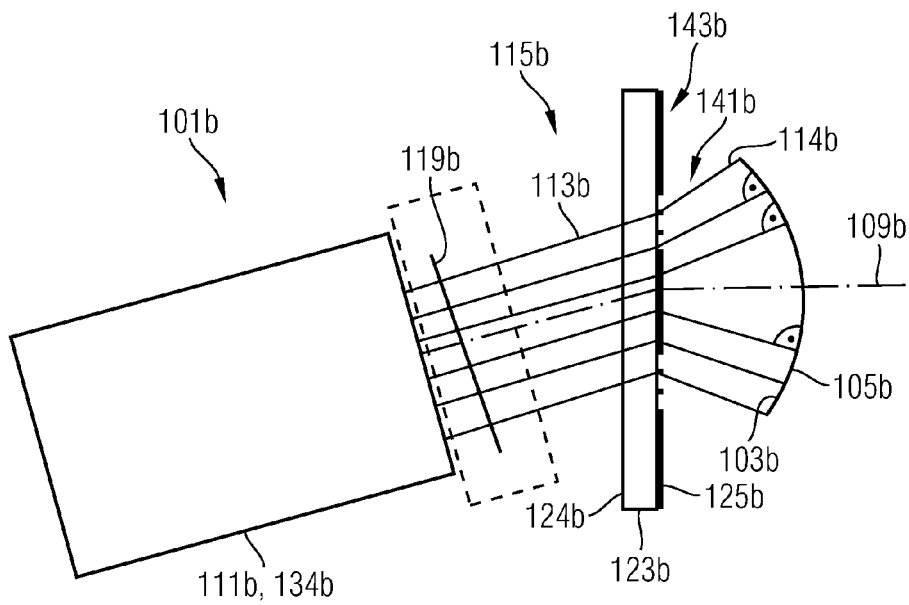
FIG. 19 the interferometer arrangement shown in FIG. 18, an object with an aspherical surface to be measured being disposed in the optical path.

FIG. 19 shows the interferometer arrangement 101b illustrated in FIG. 18, unlike FIG. 18 an aspherical optical surface 103b to be measured being positioned here in the optical path of the interferometer arrangement 101b. In this case measuring light strikes the aspherical surface 103b to be measured substantially orthogonally, said measurement light having been diffracted on the grating formed by the diffraction structures 145b, 146b under the same diffraction order as in the configuration of FIG. 18, but having been diffracted in the over-grating formed by the bands 141b, 143b under a diffraction order different from the configuration of FIG. 18. From the interferograms recorded by the detector 134b in the measuring structure of FIG. 19 it is then possible to establish the actual form of the optical surface 133b in order to compare the latter with the desired form of the latter and to undertake re-processing of the optical surface 103b such that the form of the latter is approximated to the desired form.

In the embodiment explained by means of FIG. 17, the grating formed by the individual diffraction elements 145b, 146b is a carrier frequency grating, whereas the over-grating formed by the bands 141b and 143b does not have a carrier frequency. It is however also possible, in a variation of this embodiment, for the over-grating formed by bands to also have a carrier frequency. Furthermore, it is possible for just the over-grating formed by bands to have a carrier frequency, whereas the grating formed by the individual diffraction elements does not have a carrier frequency.

In the embodiment explained by means of FIGS. 18 and 19 the calibration body has a spherical surface form, whereas the optical element to be produced has an aspherical surface form. It is also possible, however, for the optical surface to be produced to be a free-form surface, i.e. it does not have symmetry in relation, for example, to an axis of rotation or in relation to a point. Furthermore, it is possible for the calibration body to have a rotationally symmetrical aspherical surface or a free-form surface, the optical surface to be produced being a free-form surface.

In the embodiments explained above, the grating formed by the individual diffraction elements 145, 146 has two different types of diffraction element which differ with regard to their optical properties. It is also possible, however, for this type of grating to be made up of three or more different diffraction elements which are positioned alternately one next to the other in sequence, and which differ as regards their optical properties, by means of which, for example, the effect of a blazed grating can be provided.

Furthermore, the over-grating formed in the embodiments explained above is formed by two different types of band respectively positioned adjacent to one another. It is also possible, however, to provide three of more different types of band here which differ as regards their optical properties so that the over-grating also provides the function, for example, of a blazed grating.

Figure 20:
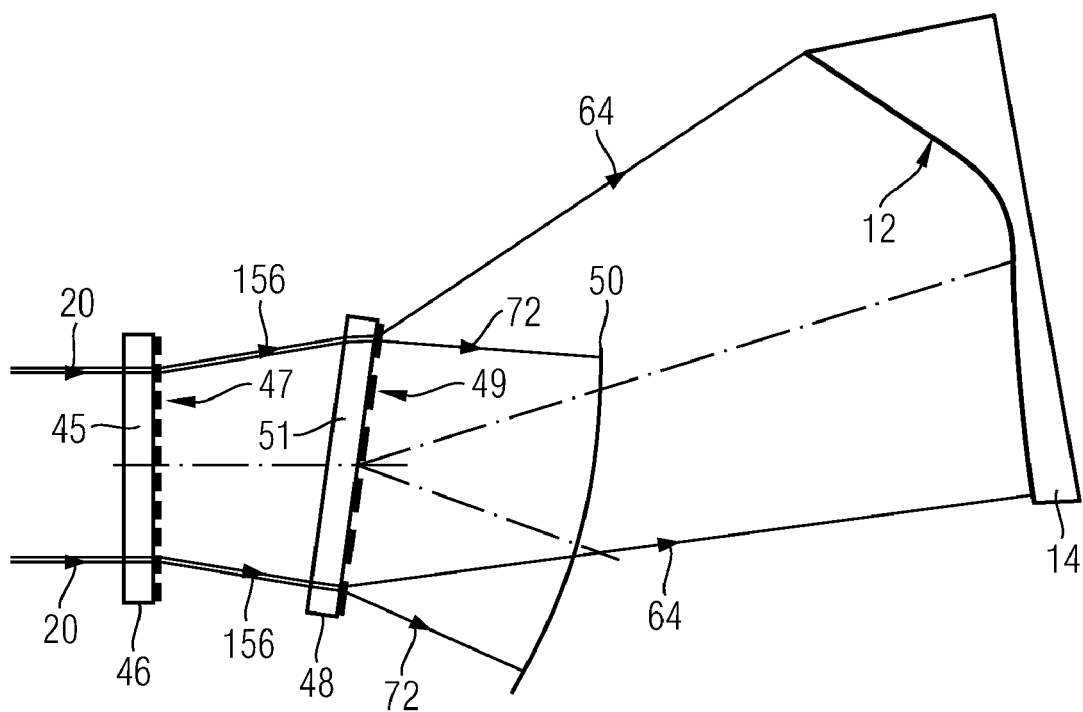
FIG. 20 region II according to FIG. 1 of a further embodiment according to the invention of an interferometric measuring apparatus in a representation illustrating both a calibration mode and a measuring mode of the measuring apparatus.

FIG. 20 shows region II according to FIG. 1 of a measuring apparatus 10 in a further embodiment according to the invention. This embodiment differs from the embodiment according to FIG. 1 in the configuration of the diffractive structures 47 and 49 of the diffractive elements 46 and 48, respectively, and the type of diffraction generating the adapted wave 64 and the calibration wave 72. The diffractive structures 47 and 49 are respectively disposed on their own substrate, namely on the first substrate 45 of the first diffractive element 46 and on the second substrate 51 of the second diffractive element 48, respectively.

The phase function $\phi_1$ of the first diffractive structure 47 comprises a first spherical component $\phi_{sph1}$, a first non-spherical component $\phi_{non-sph1}$ and optionally a first tilt component $\phi_{tilt1}$. The phase function $\phi_2$ of the second diffractive structure 47 comprises a second spherical component $\phi_{sph2}$, a second non-spherical component $\phi_{non-sph2}$ and optionally a second tilt component $\phi_{tilt2}$. The respective phase function components manipulate the wavefront of an incident wave by adding the respective component to the wavefront. For example the first non-spherical component $\phi_{non-sph1}$ causes the wavefront of the plane incoming measuring wave 20 during diffraction under a diffraction order different from the $0^{th}$ diffraction order to be converted such that the resulting intermediate wave 156 comprises the first non-spherical component $\phi_{non-sph1}$.

According to the embodiment illustrated in FIG. 20 the first non-spherical component $\phi_{non-sph1}$ and the second non-spherical component $\phi_{non-sph2}$ are identical ($\phi_{non-sph1} = \phi_{non-sph2}$). In a measuring mode the adapted wave 64 is generated by diffracting the incoming measuring wave 20 at each of the diffractive structures 47 and 49 under diffraction orders of the same sign, which diffraction orders differ from the $0^{th}$ diffraction order. According to one variation referred to subsequently, the incoming measuring wave 20 is diffracted at the first diffractive structure 47 under the +1. diffraction order and the resulting intermediate wave 156 is then diffracted at the second diffractive structure 49 also under the +1. diffraction order to result in the adapted wave 64. In this case $m_1=1$ and $m_2=1$, referring to the nomenclature used above with respect to the embodiment including an over-grating.

The spherical components $\phi_{sph1}$ and $\phi_{sph2}$ are not identical. Therefore a first one of the diffractive structures 47 and 49 contributes a predominant portion to the spherical component of the resulting adapted wave 64. In one example the spherical component $\phi_{sph1}$ of the first diffractive structure 47 is considerably larger, especially at least one order of magnitude larger, than the spherical component $\phi_{sph2}$ of the second diffractive structure 49. The wavefront of the adapted wave 64 generated in the measuring mode at $m_1=1$ and $m_2=1$ according to FIG. 20 has a spherical component equal to the sum of $\phi_{sph1}$ and $\phi_{sph2}$. The tilt components $\phi_{tilt1}$ and $\phi_{tilt2}$ add up in the measuring mode resulting in the tilt of the adapted wave 64 shown in FIG. 20.

Prior to performing the measurement of the optical surface 12 using the adapted wave 64, the measuring apparatus 10 is operated in a calibration mode. In the calibration mode the diffractive structures 47 and 49 are operated under the same diffraction orders, but of opposite sign. In the variation referred to above ($m_1=m_2=1$ in the measuring mode) the incoming wave 20 is in the calibration mode first diffracted at the first diffractive structure 47 under the +1. diffraction order ($m_1=1$) and the resulting intermediate wave 156 is then diffracted at the second diffractive structure 49 under the −1. diffraction order ($m_2=-1$). As the non-spherical components $\phi_{non-sph1}$ and $\phi_{non-sph1}$ are equal, the wavefront of the resulting calibration wave 72 has no non-spherical component.

As mentioned above, the spherical components $\phi_{sph1}$ and $\phi_{sph2}$ differ from each other such that the wavefront of the calibration wave 72 has a corresponding nonspherical component ($\phi_{sph1}-\phi_{sph2}$). The tilt of the calibration wave 72 results from the difference between the individual tilt components ($\phi_{tilt2}-\phi_{tilt2}$). In the example shown in FIG. 20 the tilt component $\phi_{tilt1}$ is smaller than the tilt component $\phi_{tilt2}$ resulting in a tilted calibration wave 72. It is, however, also possible to adjust the tilt components $\phi_{tilt1}$ and $\phi_{tilt2}$ to be equal.

The diffractive elements 46 and 48 are calibrated in the calibration mode using a calibration sphere 50 of the type already illustrated above. For this purpose the calibration wave 72 is reflected at the calibration sphere 50 and its deviation is measured with respect to the reference wave 40 illustrated in FIG. 1. Subsequently, the result obtained in the calibration mode is subtracted from the measurement result of the optical surface 12 obtained in the measurement mode. This way error components can be eliminated from the measurement as explained subsequently.

The interferometer arrangement explained above can in particular also be implemented such that the diffraction grating is exchangeable, and different diffraction gratings can thus be introduced into the optical path of the interferometer arrangement in order to measure different optical surfaces.

The embodiments of the invention described above make it possible to produce an optical element with an optical surface, the optical surface having an aspherical desired shape, and the actual shape of the optical surface deviating by maximum 0.2 mm from the desired shape.

The invention claimed is:

1. A method of determining a deviation of an actual shape from a desired shape of an optical surface, comprising:
   providing an incoming electromagnetic measuring wave,
   providing two diffractive structures,
   calibrating at least one of the two diffractive structures by radiating the incoming measuring wave onto the at least one diffractive structure to be calibrated, and determining a calibration deviation of the actual wavefront from a desired wavefront of the measuring wave after interaction of the actual wavefront with the at least one diffractive structure to be calibrated,
   positioning the two diffractive structures in the optical path of the incoming measuring wave such that individual rays of the measuring wave radiate through both diffractive structures, and reshaping the incoming measuring wave using the two diffractive structures to form an adapted measuring wave the wavefront of which is adapted to the desired shape of the optical surface,
   positioning the optical surface in the optical path of the adapted measuring wave so that the adapted measuring wave interacts with the optical surface, and
   measuring the wavefront of the adapted measuring wave after interaction of the adapted measuring wave with the optical surface.

2. The method according to claim 1, wherein:
   a first of the two diffractive structures produces a predominant portion of the wavefront reshaping when reshaping the incoming measuring wave to form the adapted measuring wave, and this diffractive structure is calibrated.

3. The method according to claim 1, wherein:
   the incoming measuring wave is irradiated onto the two diffractive structures positioned one after the other in the optical path of the incoming measuring wave, such that a calibration wave and the adapted wave are generated, wherein the calibration wave is generated by diffracting the incoming measuring wave sequentially at the two diffractive structures in a first combination of diffraction orders, and the adapted measuring wave is generated by diffracting the incoming measuring wave sequentially at the two diffractive structures in a second combination of diffraction orders differing from the first combination,
   the calibrating of the at least one of the two diffractive structures includes arranging a calibration object in a calibration position, in which the calibration wave impinges upon the calibration object, and analysing the calibration wave after interaction with the calibration object, and
   the optical surface to be measured is arranged in a measuring position for the measuring of the wavefront of the adapted measuring wave after interaction with the optical surface.

4. The method according to claim 1, wherein:
   each of the diffractive structures has a respective individual phase function differing from each other, such that the wavefront of the incoming measuring wave after an interaction with the diffractive structures is modified by an effective phase function, which effective phase function is formed by a linear combination of the individual phase functions of the two diffractive structures,
   the calibrating of the at least one of the two diffractive structures includes arranging a calibration object in a calibration position, in which a calibration wave impinges upon the calibration object, which calibration wave is formed by interaction of the incoming measuring wave with the diffractive structures such that its effective phase function is formed by a first linear combination of the individual phase functions, and analysing the calibration wave after interaction with the calibration object,
   the adapted measuring wave is formed by interaction of the incoming measuring wave with the diffractive structures such that its effective phase is formed by a second linear combination of the individual phase functions differing from the first linear combination, and the optical surface to be measured is arranged in a measuring position for the measuring of the wavefront of the adapted measuring wave after interaction with the optical surface.

5. The method according to claim 4, wherein the adapted measuring wave has a wavefront $\phi_P$ and the calibration wave has a wavefront $\phi_K$, which wavefronts are mathematically described by:

$$\phi_P = m_1 * \phi_1 + m_{2P} * \phi_2, \text{ and}$$

$$\phi_K = m_1 * \phi_1 + m_{2K} * \phi_2,$$

$\phi_{1/2}$ indicating the individual phase functions of the two diffractive structures, $m_1$ indicating the diffraction order of the incoming measuring wave on the first diffraction structure, wherein $m_1 \neq 0$, $m_{2P}$ indicating the diffraction order of the adapted measuring wave on the second diffractive structure, and $m_{2K}$ indicating the diffraction order of the calibration wave on the second diffractive structure, wherein $m_{2P} \neq m_{2K}$.

6. The method according to claim 1, wherein:
the two diffractive structures are disposed on respective substrates and are configured such that the wavefront of the adapted measuring wave, which is generated from the incoming measuring wave by subsequently diffracting the measuring wave at each of the diffractive structures under diffraction orders of the same sign, has a non-spherical component, wherein half of the non-spherical component is caused by each of the diffractive structures during the diffraction of the incoming measuring wave at the diffractive structures.

7. The method according to claim 6, wherein:
both diffractive structures are calibrated by analyzing a calibration wave of spherical shape, which calibration wave is generated from the incoming measuring wave by subsequently diffracting the measuring wave at each of the diffractive structures under diffraction orders of opposite sign.

8. The method according to claim 7, wherein:
the diffractive structures are configured such that the wavefront of the adapted measuring wave further has a spherical component.

9. The method according to claim 8, wherein:
a first one of the diffractive structures contributes a predominant portion of the spherical component to the wave front of the adapted wave.

10. The method according to claim 8, wherein:
a first one of the diffractive structures contributes a portion of the spherical component to the wave front of the adapted wave, which portion is at least one magnitude larger than a portion of the spherical component contributed by the second diffractive structure to the wave front of the adapted wave.

11. The method according to claim 6, wherein:
the line density of one of the diffractive structures is less than 100 lines per millimeter.

12. The method according to claim 1, wherein:
each of the diffractive structures is disposed on a respective substrate.

13. The method according to claim 1, wherein:
the two diffractive structures are overlaid on a common substrate.

14. The method according to claim 1, wherein:
the diffractive structures are configured such that the desired wavefront of the measuring wave produced when calibrating the at least one diffractive structure has a spherical shape, and the wavefront of the adapted measuring wave has a rotationally symmetrical aspherical shape.

15. The method according to claim 1, wherein:
the two diffractive structures form part of a diffractive element and the diffractive element comprises:

a carrier and a diffraction structure, provided on the carrier, which comprises a plurality of elongated diffraction elements which extend in a plane in at least one region of the diffraction structure, at least a first type of diffraction element and a second type of diffraction element in the at least one region, as viewed in directions orientated laterally to the extension directions of the diffraction elements, which are positioned alternately one next to the other, and forming the first diffractive structure, and wherein:

the first type of diffraction element and the second type of diffraction element have optical properties different from one another, in the at least one region at least a first type of elongated band and a second type of elongated band extend in the plane and form the second diffractive structure, the first type of band and the second type of band in the at least one region, as viewed in directions orientated laterally to the extension directions of the bands, are positioned alternately one next to the other, and the first type of band and the second type of band differ with regard to an arrangement pattern of diffraction elements within the bands.

16. The method according to claim 15, wherein: within the first type of band, diffraction elements of the first type and of the second type are positioned alternately one next to the other, and the second type of band is free of diffraction elements of the first type and of the second type.

17. The method according to claim 15, wherein: with a first band of the first type and a band of the second type directly adjacent to the first band, the arrangement pattern of the first and of the second diffraction elements is arranged with a substantially equal local frequency but with a substantially opposite phase.

18. An apparatus for determining a deviation of an actual shape from a desired shape of an optical surface, comprising:

a source of an incoming electromagnetic measuring wave, two diffractive structures designed to reshape the wavefront of an arriving wave, the two diffractive structures being disposed in a measuring mode in the optical path of the incoming measuring wave such that individual rays of the measuring wave radiate through both diffractive structures and the incoming measuring wave is reshaped by the two diffractive structures to form an adapted measuring wave, the wavefront of which is adapted to the desired shape of the optical surface, a calibration device configured to calibrate at least one of the two diffractive structures by determining a calibration deviation of the actual wavefront from a desired wavefront of the measuring wave after interaction of the measuring wave with the at least one diffractive structure being calibrated, and a wavefront measuring device configured to measure the wavefront of the adapted measuring wave after interaction of the adapted measuring wave with the optical surface.

19. A method of determining a deviation of an actual shape from a desired shape of an optical surface to be measured, comprising:

irradiating a measuring wave onto two diffractive structures positioned one after the other in the optical path of the measuring wave, such that a calibration wave and an adapted wave are generated, wherein the calibration wave is generated by diffracting the measuring wave sequentially at the two diffractive structures in a first combination of diffraction orders, and the adapted wave is generated by diffracting the measuring wave sequentially at the two diffractive structures in a second combination of diffraction orders differing from the first combination, arranging a calibration object in a calibration position, in which the calibration wave impinges upon the calibration object, and analysing the calibration wave after interaction with the calibration object, and arranging the optical surface to be measured in a measuring position, in which the adapted wave impinges upon the optical surface, and measuring the wavefront of the adapted wave after interaction with the optical surface.

* * * * *

UNITED STATES PATENT AND TRADEMARK OFFICE
CERTIFICATE OF CORRECTION

PATENT NO. : 8,345,262 B2
APPLICATION NO. : 13/361442
DATED : January 1, 2013
INVENTOR(S) : Frank Schillke, Rolf Freimann and Matthias Dreher It is certified that error appears in the above-identified patent and that said Letters Patent is hereby corrected as shown below:

Title Page 2, References Cited, column 2, line 7, under "Other Publications": delete "asperic" and insert -- aspheric --

Title Page 2, References Cited, column 2, line 40, under "Other Publications": delete "Punlication" and insert -- Publication --

In the Specifications:

Column 13, line 2: delete "means means" and insert -- means --

Column 16, line 27: delete "11," and insert -- 11; --

Column 16, line 47: delete "apparatus;" and insert -- apparatus. --

Column 22, Line 49: delete "$\Phi_{GGH}$" and insert -- $\Phi_{CGH}$ --

Column 23, Line 59: delete "$\Phi 2$" and insert -- $\Phi_2$ --

In the Claims:

Column 29, Line 6: In Claim 5, delete "$\Phi_p$" and insert -- $\Phi_P$ --

Signed and Sealed this
Third Day of September, 2013

Teresa Stanek Rea
*Acting Director of the United States Patent and Trademark Office*